(12) United States Patent  (10) Patent No.: US 8,482,867 B2
Kubota  (45) Date of Patent: Jul. 9, 2013

(54) IMAGING OPTICAL SYSTEM, AND IMAGING APPARATUS INCORPORTING THE SAME

(75) Inventor: Yuki Kubota, Hachiojo (JP)

(73) Assignee: Olympus Imaging Corp., Tokyo (JP)

( * ) Notice: Subject to any disclaimer, the term of this patent is extended or adjusted under 35 U.S.C. 154(b) by 76 days.

(21) Appl. No.: 13/135,778

(22) Filed: Jul. 11, 2011

(65) Prior Publication Data
US 2012/0026609 A1  Feb. 2, 2012

(30) Foreign Application Priority Data
Jul. 27, 2010 (JP) .................................. 2010-167789

(51) Int. Cl.
*G02B 9/12* (2006.01)
(52) U.S. Cl.
USPC ........................................................ 359/784
(58) Field of Classification Search
USPC ................. 359/754–759, 763, 764, 766, 767, 359/771–774, 780–784
See application file for complete search history.

(56) References Cited

U.S. PATENT DOCUMENTS

| 6,115,188 | A | 9/2000 | Nishio et al. |
| 7,411,745 | B2 | 8/2008 | Wada |
| 2009/0190239 | A1* | 7/2009 | Suzuki .......................... 359/748 |

FOREIGN PATENT DOCUMENTS

| JP | 11-160617 | 6/1999 |
| JP | 2005-321574 | 11/2005 |

* cited by examiner

*Primary Examiner* — Darryl J Collins
(74) *Attorney, Agent, or Firm* — Kenyon & Kenyon LLP

(57) ABSTRACT

The invention provides an imaging optical system comprising, in order from an object side to an image side thereof, a first lens group of positive refracting power, a second lens group having positive or negative refracting power and a third lens group of positive refracting power. The optical system includes an aperture stop located between an object-side surface in the first lens group and an object-side surface in the second lens group. The lens on the most object side of the first lens group and the lens on the most image side of the third lens group remain constantly fixed, and upon focusing from a far distance to a near distance, only the second lens group moves axially. The third lens group comprises a front lens subgroup of positive refracting power located on the object side and a rear lens subgroup of negative refracting power located on the image side, with the largest axial air separation in the third lens group interposed between them.

18 Claims, 24 Drawing Sheets

Example 1

(a)

(b)

Example 1

(a)

(b)

Example 2

(a)

(b)

Example 3

(a)

(b)

Example 4

(a)

(b)

Example 5

(a)

(b)

Example 6

(a)

(b)

Example 7

(a)

(b)

Example 8

(a)

(b)

Example 9

(a)

(b)

Example 10

(a)

(b)

Example 1

Example2

Example3

(a)

(b)

Example 4

Example5

Example6

Example 7

(a)

(b)

Example 8

Example9

(a)

(b)

Example10

IMAGING OPTICAL SYSTEM, AND IMAGING APPARATUS INCORPORATING THE SAME

This application claims benefit of Japanese Application No. 2010-167789 filed in Japan on Jul. 27, 2010, the contents of which are incorporated by this reference.

BACKGROUND OF THE INVENTION

The present invention relates generally to an optical system used with imaging apparatus or the like, and more particularly to an imaging optical system well fit for a single focus interchangeable lens in a mirrorless type camera as well as an imaging apparatus incorporating the same.

So far, there has been an imaging optical system known in the art, which keeps its full length constant, makes use of an inner focus mode, and works in favor of dustproofing and sound-proofing. The imaging optical system set forth typically in JP(A)s 11-160617 and 2005-321574 is comprised of, in order from its object side, a first lens group of positive refracting power, a second lens group of negative refracting power, an aperture stop and a third lens group of positive refracting power, wherein the first and third lens groups remain constantly fixed, and the second lens group of negative refracting power is moved toward the image side upon focusing from a far distance to a near distance. This makes the optical system more favorable for dustproofing and soundproofing, and permits it to have much higher optical performance as well.

SUMMARY OF THE INVENTION

The present invention provides an imaging optical system comprising, in order from its object side to its image plane side, a first lens group of positive refracting power, a second lens group having positive or negative refracting power and a third lens group of positive refracting power, wherein an aperture stop is located between an object-side surface in the first lens group and an object-side surface in the second lens group, the most-object-side lens in the first lens group and the most-image-side lens in the third lens group remain constantly fixed, only the second lens group moves axially upon focusing from a far distance to a near distance, and the third lens group comprises a front lens subgroup of positive refracting power located on the object side and a rear lens subgroup located on the image side with the largest axial air separation in the third lens group interposed between them.

The requirements for, and the advantages of, such arrangement are now explained.

The inventive imaging optical system works more in favor of dustproofing and soundproofing by allowing the most-object-side and most-image-side lenses to remain constantly fixed, and taking advantage of the inner focus mode wherein only the second lens group is moved in the axial direction upon focusing.

Here if the aperture stop is located on the object side with respect to the second lens group, it is then possible to curtail the effective diameter of the first lens group having the greatest influence on the size of the imaging optical system, thereby reducing the size of the optical system in the diametrical direction.

In addition, the size of the first lens group in the diametrical direction is so reduced that the axial thickness of the first lens group of positive refracting power can be easily reduced. This works more in favor of the size reduction of the imaging optical system, resulting in improvements in its ability to be carried around.

In consideration of reducing the weight of the imaging optical system, making sure the range of movement of the second lens group for focusing from a far object to a nearby object and aberration correction, on the other hand, the third lens group will be spaced away from the aperture stop. The third lens group of positive refracting power will then be spaced far away from the aperture stop because the latter is located on the object side with respect to the second lens group. In that case, to correct aberrations inclusive of distortion, it is preferable to design the third lens group in consideration of both axial and off-axis aberrations.

In the present invention, the third lens group is made up of a front lens subgroup of positive refracting power on the object side and a rear lens subgroup of negative refracting power on the image side with the largest axial air separation in the third lens group interposed between them.

Thus, the location of the lens subgroup of negative refracting power on the image side of the third lens group of positive refracting power enables off-axis incident rays to grow high while keeping the function of canceling axial aberrations at the front lens subgroup of positive refracting power, working more in favor of making sure the function of canceling off-axis aberrations (distortion in particular).

Therefore, the aforesaid arrangement provides an imaging optical system that works in favor of soundproofing and dustproofing, and offers a sensible tradeoff between size reductions and optical performance.

Preferably, the inventive imaging optical system should satisfy any one of the following requirements.

Preferably, the first lens group and the third lens group should remain constantly fixed.

The reason is that due to no need of any structure capable of moving the first lens group and the third lens group, the mechanism involved can be simplified.

Preferably, the rear lens subgroup in the third lens group should satisfy the following Condition (1):

$$-10 < f_{3r}/f_{3G} < -0.05 \quad (1)$$

where $f_{3r}$ is the focal length of the rear lens subgroup, and $f_{3G}$ is the focal length of the third lens group.

Making sure the rear lens subgroup has negative refracting power so as to set the lower limit to Condition (1) at not less than −10 works more in favor of correction of axial aberrations and off-axis aberrations (distortion in particular). In addition, the imaging optical system generally becomes a telephoto type leading to a curtailing of the full length of the optical system.

As the upper limit to Condition (1) is set at not greater than −0.05 so as to allow the rear lens subgroup to have a moderate negative refracting power, it prevents overcorrection. In addition, it is easy to space the exit pupil away from the image plane, working in favor of shading reductions.

Preferably, the second lens group should satisfy the following Condition (2):

$$0.1 < |f/f_{2G}| < 5.0 \quad (2)$$

where f is the focal length of the imaging optical system, and $f_{2G}$ is the focal length of the second lens group.

The lower limit to Condition (2) is set at not less than 0.1 so as to make sure the second lens group has positive or negative refracting power so that the focusing function can be ensured.

As the upper limit to Condition (2) is set at not greater than 5.0 so as to allow the focusing lens group to have a moderate refracting power, it works in favor of weight reductions of the second lens group and reduced aberration fluctuations of the second lens group during movement.

Preferably, the front lens subgroup and the rear lens subgroup in the third lens group should satisfy the following condition (3) in terms of the axial distance between them:

$$0.01 < D_{3Gfr}/f_{3G} < 0.5 \tag{3}$$

where $D_{3Gfr}$ is the axial distance between the image-side surface in the front lens subgroup and the object-side surface in the rear lens subgroup in the third lens group, and $f_{3G}$ is the focal length of the third lens group.

As the lower limit to Condition (3) is set at not less than 0.01 and the upper limit is set at not greater than 0.5 so as to make sure both the lens subgroups have a moderate distance between them, it works in favor of correction of both axial aberrations and off-axis aberrations.

Preferably, the second lens group and the third lens group should satisfy the following Condition (4) in terms of the axial distance between them:

$$0.22 < D_{2G3G}/D_{1Gf3G} < 0.8 \tag{4}$$

where $D_{2G3G}$ is the axial distance between the image-side surface in the second lens group and the object-side surface in the third lens group, and $D_{1Gf3G}$ is the axial distance between the object-side surface in the first lens group and the object-side surface in the third lens group.

As the lower limit to Condition (4) is set at not less than 0.22 so as to make sure the second lens group and the third lens group have a given axial distance between them, it makes it easy to cancel off-axis aberrations occurring within the first lens group, working in favor of weight reductions of the imaging optical system.

As the upper limit to Condition (4) is set at not greater than 0.8 so as to make sure the second lens group and the third lens group have a moderate axial distance between them, it makes it easy to diminish the imaging optical system; especially, it works in favor of size reductions of the imaging optical system when used as an interchangeable lens.

Preferably upon focusing at the farthest distance, the axial distance between the second lens group and the third lens group should be the greatest among axial air separation distances in the imaging optical system.

Making sure the second lens group and the third lens group have a given axial distance between them works in favor of correction of off-axis aberrations. Especially when the second lens group has negative refracting power, this leads to making sure the second lens group has space for movement, so to an ease of curtailing close-range distances.

The second lens group for implementing focusing is now explained.

Preferably, the second lens group should comprise two lenses at most.

The reason is that the lens group that moves for focusing can be reduced in weight; this in turn works for power savings upon wobbling and focusing, and improvements in AF speed and precision.

Moreover, the inventive imaging optical system should preferably satisfy any one of the following requirements.

Preferably, the second lens group should comprise one negative lens component, and move toward the image side upon focusing from a far distance to a near distance.

It is noted that the lens component is a lens body that is in contact with air at only two surfaces: the object-side surface and the image-side surface; that is, it means a single or cemented lens. This works in favor of reducing the weight of the second lens group.

Preferably, the negative lens component should be a single lens. This works more in favor of weight reductions.

Preferably, the negative lens component forming the second lens group should satisfy the following Condition (5).

$$-0.99 < SF < 0.99 \tag{5}$$

Note here that $SF=(R_1+R_2)/(R_1-R_2)$ where $R_1$ is the paraxial radius of curvature of the object-side lens surface of the negative lens component, and $R_2$ is the radius of curvature of the image-side lens surface of the negative lens component.

As the lower limit to Condition (5) is set at not less than −0.99 so as to leave the absolute value of the curvature of the object-side lens surface of the negative lens component small, it is easy to hold back fluctuations of coma upon focusing. As the upper limit to Condition (5) is set at not greater than 0.99 so as to make sure the object-side lens surface of the negative lens component has negative refracting power, it contributes to correction of aberrations at the first lens group.

Preferably, the second lens group should comprise one positive lens component, and move toward the object side upon focusing from a far distance to a near distance. It is noted that the lens component is a lens body that is in contact with air at only two surfaces: the object-side surface and the image-side surface; that is, it means a single or cemented lens. This works in favor of reducing the weight of the second lens group.

Preferably, the positive lens component should be a single lens. This works more in favor of reducing the weight of the imaging optical system.

Preferably, the second lens group should consist only of two lenses: a negative lens and positive lens. This mainly favors correction of chromatic aberrations at the second lens group.

Preferably, the negative lens and positive lens in the second lens group should be cemented together. This facilitates prevention of lens decentration from having adverse influences on images.

Preferably, the second lens group should consist only of two negative lenses. This enables the negative refracting power to be shared by a plurality of negative lenses, favoring coma reduction in particular.

Preferably, the second lens group should consist of two lenses: a single lens convex on its object side and a double-concave lens in order from the object side to the image side. This enables higher-order aberrations that remain under-corrected at the double-concave lens to be corrected at the meniscus lens, working in favor of making sure performance.

Preferably, the following Condition (6) should be satisfied in terms of the axial distance from the object-side surface in the first lens group to the image-side surface in the third lens group.

$$0.68 < LTL/TL < 0.90 \tag{6}$$

where LTL is the axial distance from the object-side surface in the first lens group to the image-side surface in the third lens group, and TL is the sum of that LTL and a back focus represented by a distance as calculated on an air basis.

As the lower limit to Condition (6) is set at not less than 0.68 so as to make sure the axial distance from the object-side surface in the first lens group to the image-side surface in the third lens group, it works in favor of making sure the size reduction and optical performance of the imaging optical system. As the upper limit to Condition (6) is set at not greater than 0.90 so as to space the rear lens subgroup away from the image plane, it works in favor of shading reduction because of the angle of light incident on the image plane is kept small.

Preferably, the focusing lens should be of light weight for the purpose of taking moving images or implementing fast AF. To this end, the aperture stop should preferably be located as follows.

Preferably, the aperture stop should be located on the image side of the first lens group. Consequently, the focusing lens group is located near the aperture stop while the size of the first lens group is reduced. This works in favor of the size and weight reduction of the focusing lens group.

Preferably, the aperture stop should remain constantly fixed together with the first lens group. In other words, the aperture stop remains stationary during focusing operation so that the weight of the moving member for focusing can be reduced. This works in favor of power savings at the time of AF (wobbling) operation at the time of taking moving images or fast AF operation as well as improvements in AF speed and precision.

Preferably, the first lens group should be designed or set up as follows.

Preferably, the first lens group should comprise two positive lenses and at least one negative lens located on the object side of that aperture stop.

As the positive refracting power is shared by a plurality of positive lenses and the negative lens is used, it favors correction of spherical aberrations, coma and chromatic aberrations.

Preferably, the first lens component should comprise, in order from the object side to the image side, a lens component of positive refracting power, and a cemented lens component that includes a positive lens and a negative lens and is convex on its object side. It is noted that the lens component is a lens body that is in contact with air at only two surfaces: the object-side surface and the image-side surface; that is, it means a single or cemented lens.

As the positive refracting power is shared by the object-side lens component and the image-side lens component and the negative lens is used for that image-side lens component, it favors correction of spherical aberrations, coma and chromatic aberrations.

Preferably, the third lens group should be designed or set up as follows.

Preferably in the third lens group, the front lens subgroup should comprise two lenses, and the rear lens subgroup should comprise one lens component of negative refracting power.

As the front lens subgroup comprises a plurality of lenses, it favors aberration reduction because the positive refracting power is shared by them or aberrations are canceled each other. As the rear lens subgroup comprises one lens component, it favors weight reduction.

Preferably, the front lens subgroup in the third lens group should comprise two positive lens components. As the front lens subgroup is comprised of a plurality of lens components, it favors aberration reduction because the positive refracting power is shared by them.

Preferably, the first lens group and the aperture stop should satisfy the following Condition (7) in terms of their effective diameter.

$$0.5 < ES/E_{1Gf} < 0.95 \quad (7)$$

where ES is the effective diameter of the aperture stop, and $E_{1Gf}$ is the effective diameter of the object-side surface in the first lens group provided that when there is an effective diameter change, the effective diameter refers to the one at full aperture.

As the lower limit to Condition (7) is set at not less than 0.5, it leads to the size reduction of the first lens group. As the upper limit to Condition (7) is set at not greater than 0.95 so as to prevent the aperture stop from drawing near to the object side, it facilitates prevention of barrel distortion.

The distance between the object-side lens surface and the image-side lens surface with the aperture stop-receiving space interposed between them should satisfy the following Conditions (8) and (9).

$$0.03 < DS_{on\_ax}/f < 0.19 \quad (8)$$

$$0.03 < DS_{off\_ax}/f < 0.19 \quad (9)$$

where $DS_{on\_ax}$ is the axial distance between the object-side lens surface and the image-side lens surface with the aperture stop-receiving space interposed between them provided that when there is an axial distance change, it refers to the minimum value, $DS_{off\_ax}$ is the axially measured distance between the positions of the object-side lens surface and the image-side lens surface, with the aperture stop-receiving space interposed between them, where light rays grow the highest provided that when the axially measured distance changes, it refers to the minimum value, and f is the focal length of the imaging optical system.

As the lower limit to Conditions (8) and (9) is set at not less than 0.03 so as to make sure the space for receiving the aperture stop, it works for making sure the space for receiving an aperture stop-driving mechanism when the aperture size of the aperture stop is variable. As the upper limit to Conditions (8) and (9) is set at not greater than 0.19 so as to make sure a moderate space for receiving the aperture stop, it works in favor of full length curtailing.

These embodiments of the inventive imaging optical system may be effectively used with imaging apparatus such as digital cameras because the exit pupil is easily spaced away from the image plane, resulting in higher performance.

The present invention also provides an imaging apparatus comprising an imaging optical system, and an imaging device that is located on the image side of the imaging optical system and converts an optical image into electrical signals, wherein the imaging optical system is any one of the imaging optical system embodiments as mentioned above.

Unless otherwise stated, each embodiment is presumed to be focused on the farthest distance. More preferably, the above requirements should be satisfied simultaneously in combination.

More preferably, the lower limit and/or the upper limit to each condition should be reduced down because its advantage gets more noticeable.

To Condition (1), the lower limit should more preferably be set at −5.0, especially −1.6, and the upper limit should more preferably be set at −0.1, especially −0.15.

To Condition (2), the lower limit should more preferably be set at 0.4, especially 0.7, and the upper limit should more preferably be set at 3.5, especially 2.5.

To Condition (3), the lower limit should more preferably be set at 0.015, especially 0.017, and the upper limit should more preferably be set at 0.35, especially 0.25.

To Condition (4), the lower limit should more preferably be set at 0.24, especially 0.25, and the upper limit should more preferably be set at 0.7, especially 0.6.

To Condition (5), the lower limit should more preferably be set at −0.85, especially −0.7, and the upper limit should more preferably be set at 0.85, especially 0.7.

To Condition (6), the lower limit should more preferably be set at 0.7, especially 0.72, and the upper limit should more preferably be set at 0.85, especially 0.81.

To Condition (7), the lower limit should more preferably be set at 0.55, especially 0.6, and the upper limit should more preferably be set at 0.9, especially 0.84.

To Condition (8), the lower limit should more preferably be set at 0.04, especially 0.05, and the upper limit should more preferably be set 0.17, especially 0.15.

To Condition (9), the lower limit should more preferably be set at 0.04, especially 0.05, and the upper limit should more preferably be set at 0.17, especially 0.15.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF EXEMPLARY EMBODIMENTS

The optical systems of Examples 1 to 10 are now explained. FIGS. 1 to 10 are illustrative in section of the optical systems according to Examples 1 to 10. In each drawing, there are five plane-parallel plates shown in order from the object side: a dustproofing filter F1 that sends dust flying by ultrasonic vibrations, an IR cut filter F2 with an IR cut coating applied on it, a regulation plane-parallel plate F3 that cancels variations of the thickness of a low-pass filter in association with pixel pitch variations, a low-pass filter F4, and a cover glass C.

Figure 1:
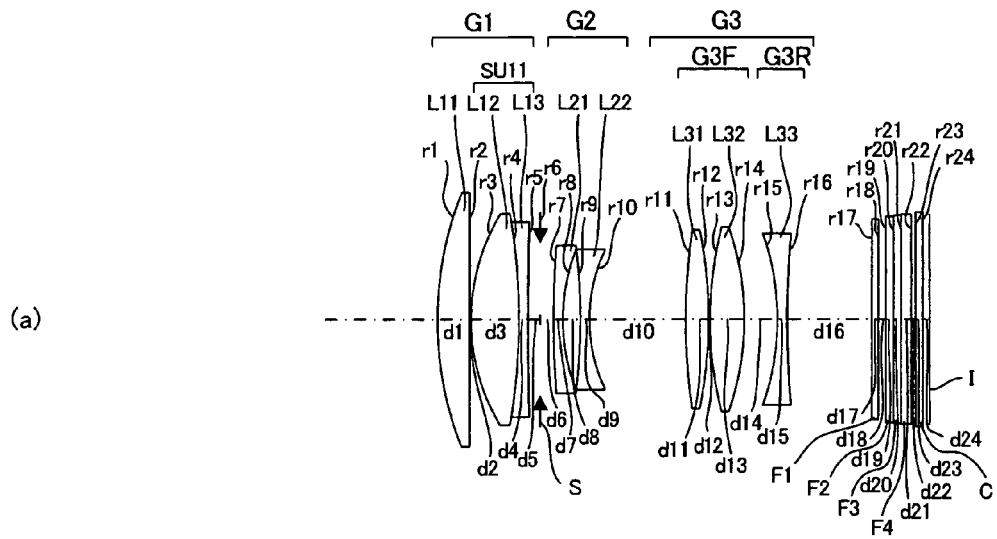
FIG. 1 is illustrative in section of the optical system of Example 1.
Figure 1:
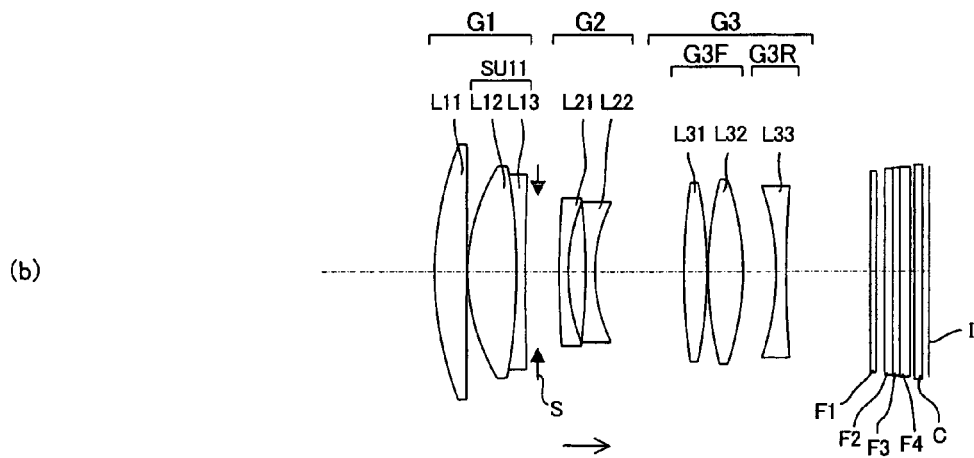

FIG. 1 is a sectional view of the optical system according to Example 1. More specifically, FIG. 1(a) is a sectional view of the optical system of Example 1 upon focusing at infinity, and FIG. 1(b) is a sectional view of the optical system of Example 1 upon close-range focusing.

As depicted in FIG. 1, the optical system of Example 1 is built up of, in order from the object side to the image side, a first lens group G1 of positive refracting power, a second lens group G2 of negative refracting power, and a third lens group G3 of positive refracting power. The optical system also includes an aperture stop S interposed between the first lens group G1 and the second lens group G2.

The first lens group G1 is made up of, in order from the object side, a negative meniscus lens L11 convex on its object side, and a cemented lens SU11 of a double-convex positive lens L12 and a double-concave negative lens L13.

The second lens group G2 is made up of, in order from the object side, a negative meniscus lens L21 convex on its object side, and a double-concave negative lens L22.

The third lens group G3 is comprised of a front lens subgroup G3F of positive refracting power, and a rear lens subgroup G3R of negative refracting power. The front lens subgroup G3F is made up of a double-convex positive lens L31 and a double-convex positive lens L32, whereas the rear lens subgroup G3R is made up of a double-concave negative lens L33.

The first lens group G1 and the third lens group G3 remain constantly fixed. The second lens group G2 moves toward the image side upon focusing from infinity to a close-range object.

Figure 2:
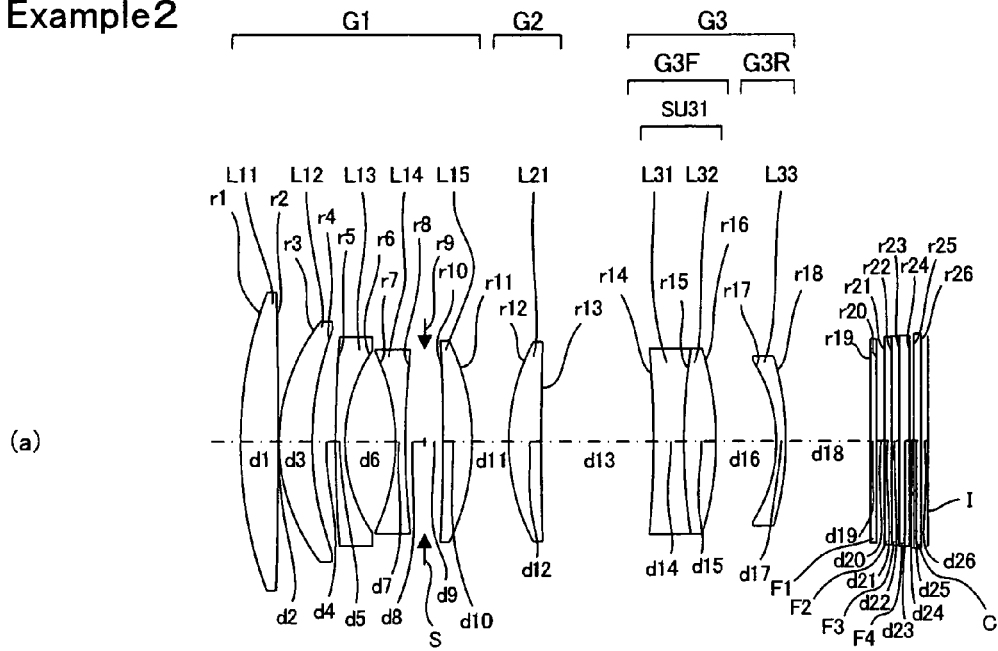
FIG. 2 is illustrative in section of the optical system of Example 2.
Figure 2:
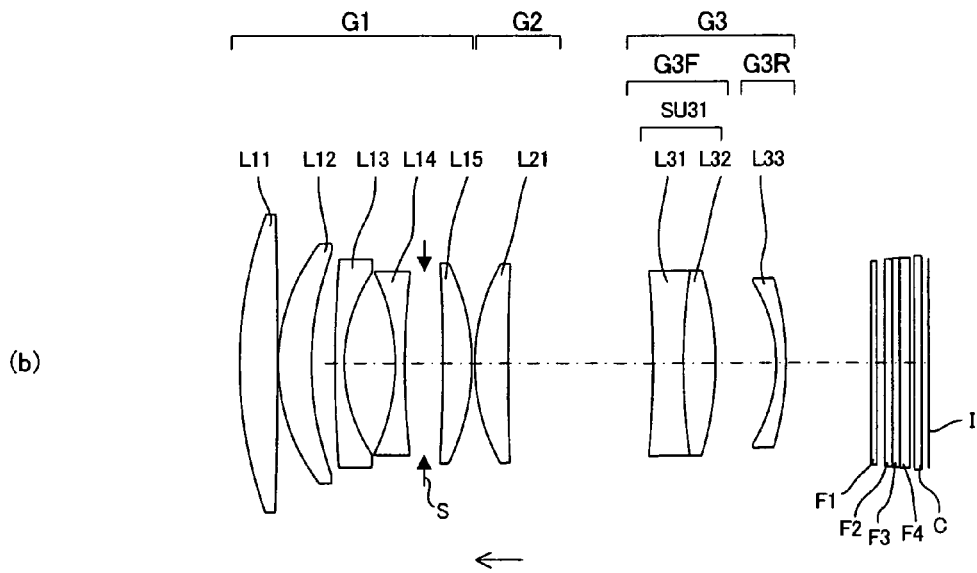

FIG. 2 is a sectional view of the optical system according to Example 2. More specifically, FIG. 2(a) is a sectional view of the optical system of Example 2 upon focusing at infinity, and FIG. 2(b) is a sectional view of the optical system of Example 2 upon close-range focusing.

As depicted in FIG. 2, the optical system of Example 2 is built up of, in order from the object side to the image side, a first lens group G1 of positive refracting power, a second lens group G2 of positive refracting power, and a third lens group G3 of positive refracting power. The optical system also includes an aperture stop S positioned in the first lens group G1.

The first lens group G1 is made up of, in order from the object side, a double-convex positive lens L11, a positive meniscus lens L12 convex on its object side, a negative meniscus lens L13 convex on its object side, a double-concave negative lens L14, the aperture stop S, and a positive meniscus lens L15 convex on its image side.

The second lens group G2 is made up of one positive meniscus lens L21 convex on its object side. The third lens group G3 is comprised of a front lens subgroup G3F of positive refracting power, and a rear lens subgroup G3R of negative refracting power. The front lens subgroup G3F is made up of a cemented lens SU31 of a double-concave negative lens L31 and a double-convex positive lens L32, whereas the rear lens subgroup G3R is made up of a negative meniscus lens L33 convex on its image side.

The first lens group G1 and the third lens group G3 remain constantly fixed. The second lens group G2 moves toward the object side upon focusing from infinity to a close-range object.

Figure 3:
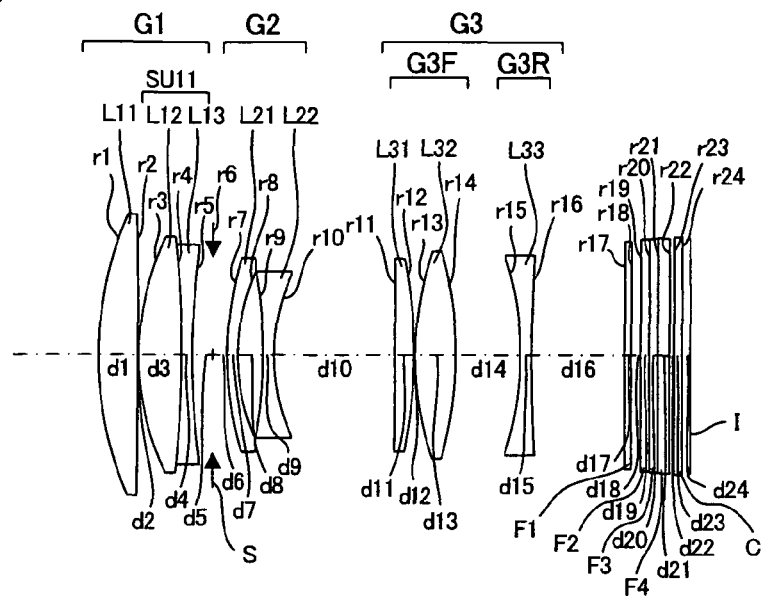
FIG. 3 is illustrative in section of the optical system of Example 3.
Figure 3:
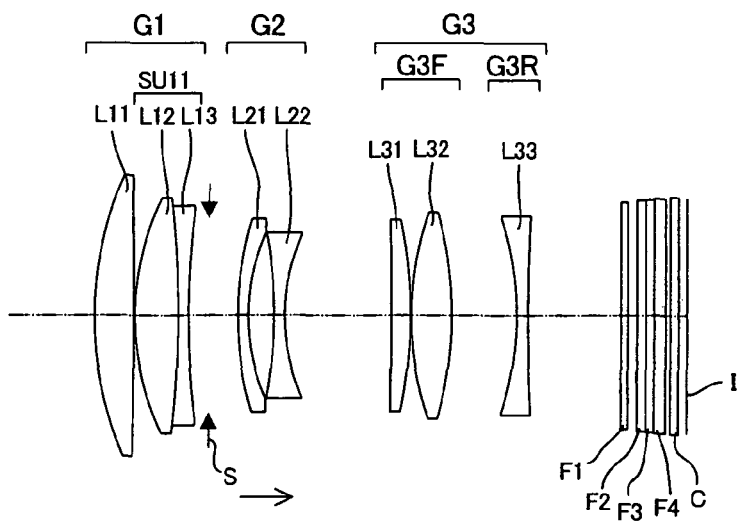

FIG. 3 is a sectional view of the optical system according to Example 3. More specifically, FIG. 3(a) is a sectional view of the optical system of Example 3 upon focusing at infinity, and FIG. 3(b) is a sectional view of the optical system of Example 3 upon close-range focusing.

As depicted in FIG. 3, the optical system of Example 3 is built up of, in order from the object side to the image side, a first lens group G1 of positive refracting power, a second lens group G2 of negative refracting power, and a third lens group G3 of positive refracting power. The optical system also includes an aperture stop S interposed between the first lens group G1 and the second lens group G2.

The first lens group G1 is made up of, in order from the object side, a double-convex positive lens L11, and a cemented lens SU11 of a double-convex positive lens L12 and a double-concave negative lens L13.

The second lens group G2 is made up of, in order from the object side, a negative meniscus lens L21 convex on its object side, and a double-concave negative lens L22.

The third lens group G3 is comprised of a front lens subgroup G3F of positive refracting power, and a rear lens subgroup G3R of negative refracting power. The front lens subgroup G3F is made up of a positive meniscus lens L31 convex on its image side and a double-convex positive lens L32, whereas the rear lens subgroup G3R is made up of a double-concave negative lens L33.

The first lens group G1 and the third lens group G3 remain constantly fixed. The second lens group G2 moves toward the image side upon focusing from infinity to a close-range object.

Figure 4:
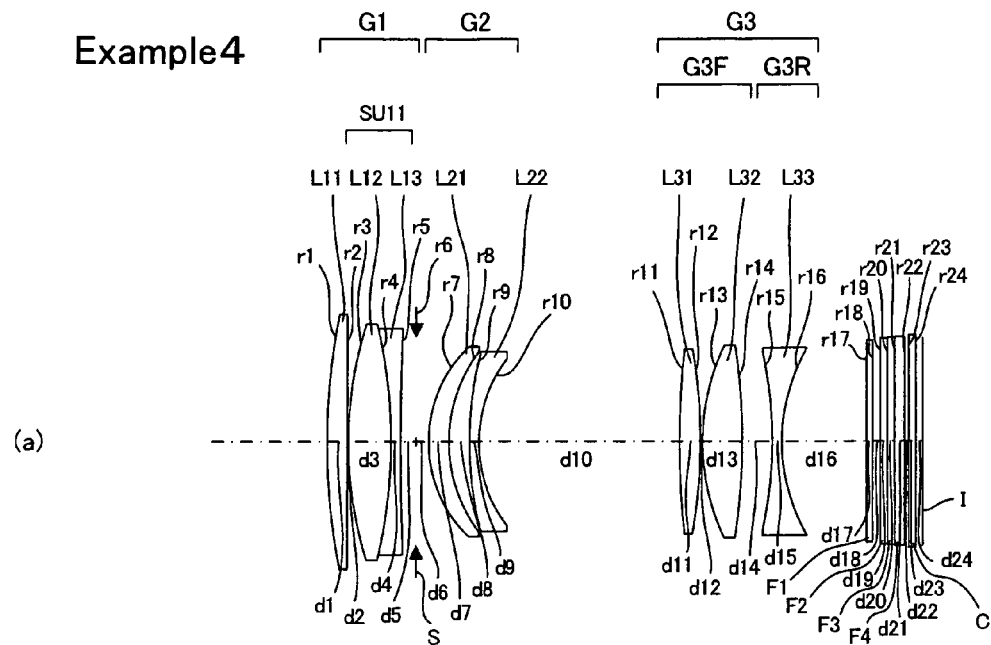
FIG. 4 is illustrative in section of the optical system of Example 4.
Figure 4:
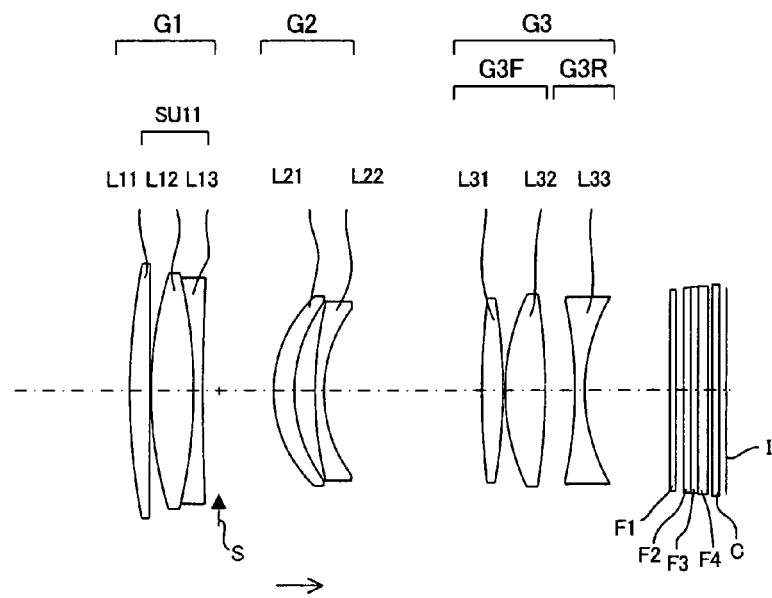

FIG. 4 is a sectional view of the optical system according to Example 4. More specifically, FIG. 4(a) is a sectional view of the optical system of Example 4 upon focusing at infinity, and FIG. 4(b) is a sectional view of the optical system of Example 4 upon close-range focusing.

As depicted in FIG. 4, the optical system of Example 4 is built up of, in order from the object side to the image side, a first lens group G1 of positive refracting power, a second lens group G2 of negative refracting power, and a third lens group G3 of positive refracting power. The optical system also includes an aperture stop S interposed between the first lens group G1 and the second lens group G2.

The first lens group G1 is made up of, in order from the object side, a double-convex positive lens L11, and a cemented lens SU11 of a double-convex positive lens L12 and a double-concave negative lens L13.

The second lens group G2 is made up of, in order from the object side, a positive meniscus lens L21 convex on its object side, and a negative meniscus lens L22 convex on its object side.

The third lens group G3 is comprised of a front lens subgroup G3F of positive refracting power, and a rear lens subgroup G3R of negative refracting power. The front lens subgroup G3F is made up of a double-convex positive lens L31 and a double-convex positive lens L32, whereas the rear lens subgroup G3R is made up of a double-concave negative lens L33.

The first lens group G1 and the third lens group G3 remain constantly fixed. The second lens group G2 moves toward the image side upon focusing from infinity to a close-range object.

Figure 5:
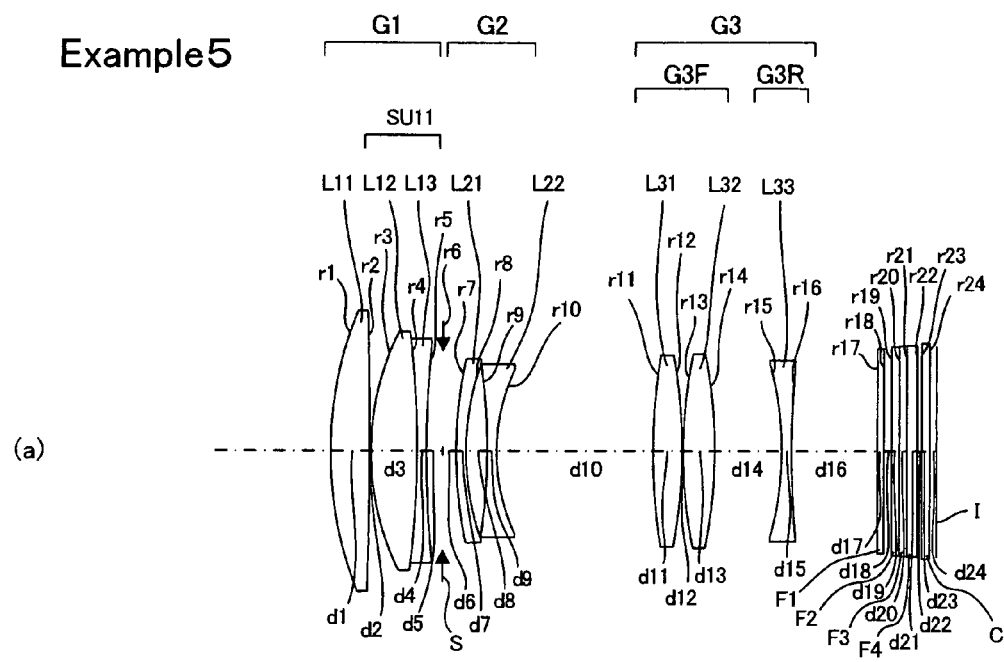
FIG. 5 is illustrative in section of the optical system of Example 5.
Figure 5:
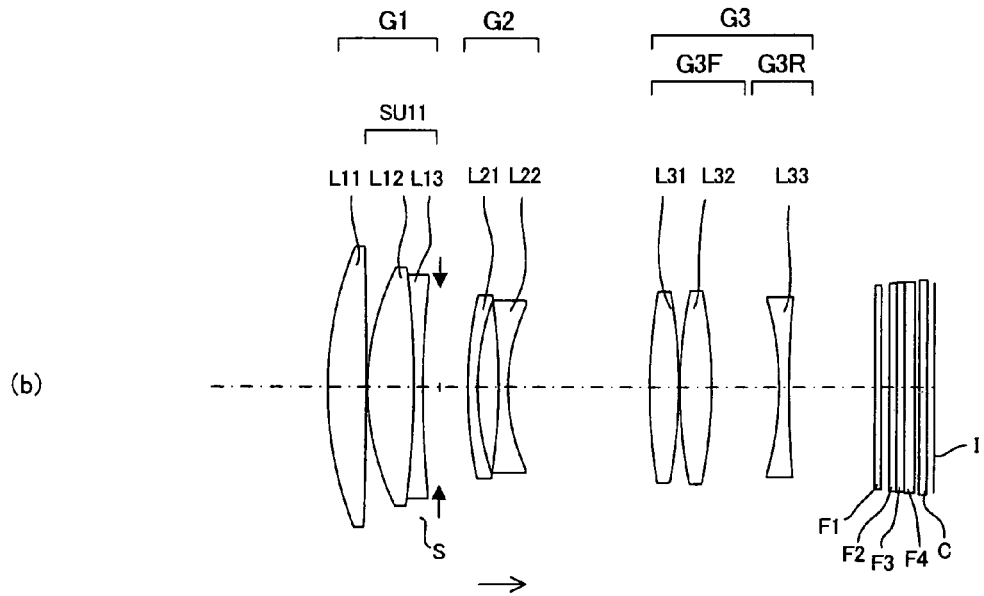

FIG. 5 is a sectional view of the optical system according to Example 5. More specifically, FIG. 5(a) is a sectional view of the optical system of Example 5 upon focusing at infinity, and FIG. 5(b) is a sectional view of the optical system of Example 5 upon close-range focusing.

As depicted in FIG. 5, the optical system of Example 5 is built up of, in order from the object side to the image side, a first lens group G1 of positive refracting power, a second lens group G2 of negative refracting power, and a third lens group G3 of positive refracting power. The optical system also includes an aperture stop S interposed between the first lens group G1 and the second lens group G2.

The first lens group G1 is made up of, in order from the object side, a double-convex positive lens L11, and a cemented lens SU11 of a double-convex positive lens L12 and a double-concave negative lens L13.

The second lens group G2 is made up of, in order from the object side, a negative meniscus lens L21 convex on its object side and a double-concave negative lens L22.

The third lens group G3 is comprised of a front lens subgroup G3F of positive refracting power, and a rear lens subgroup G3R of negative refracting power. The front lens subgroup G3F is made up of a double-convex positive lens L31 and a double-convex positive lens L32, whereas the rear lens subgroup G3R is made up of a double-concave negative lens L33.

The first lens group G1 and the third lens group G3 remain constantly fixed. The second lens group G2 moves toward the image side upon focusing from infinity to a close-range object.

Figure 6:
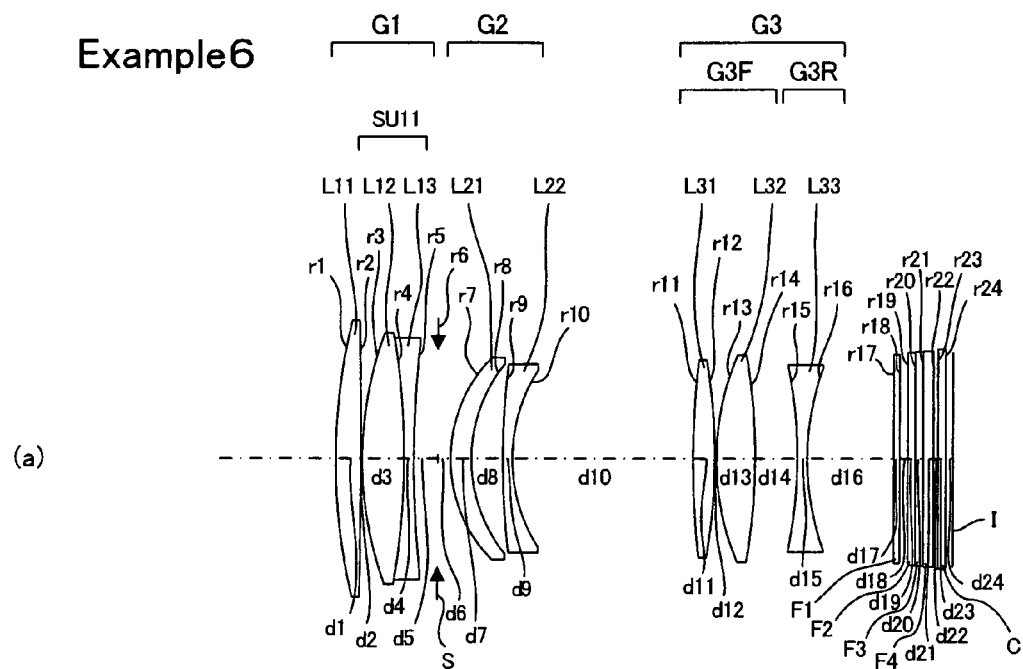
FIG. 6 is illustrative in section of the optical system of Example 6.
Figure 6:
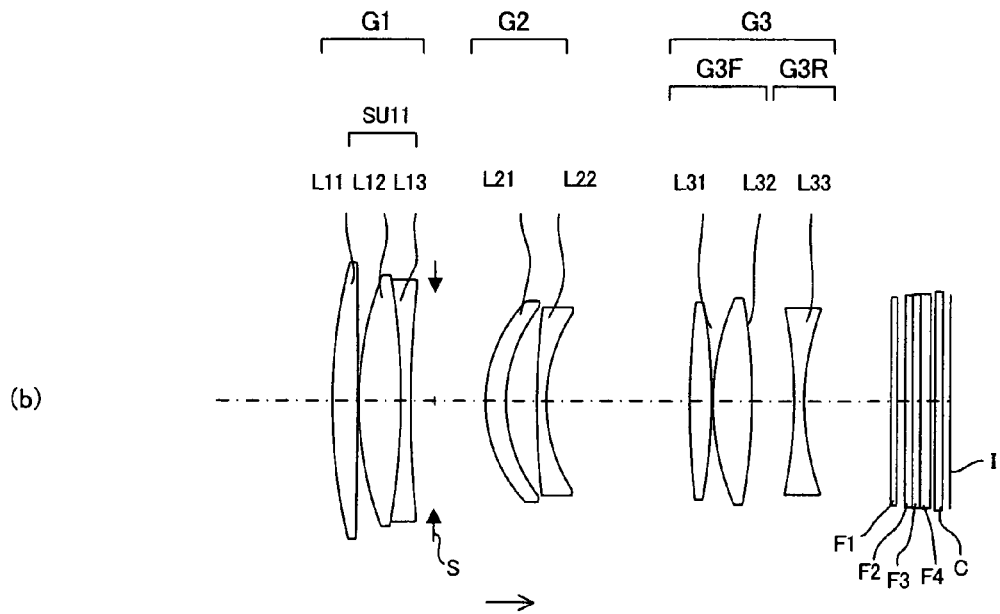

FIG. 6 is a sectional view of the optical system according to Example 6. More specifically, FIG. 6(a) is a sectional view of the optical system of Example 6 upon focusing at infinity, and FIG. 6(b) is a sectional view of the optical system of Example 6 upon close-range focusing.

As depicted in FIG. 6, the optical system of Example 6 is built up of, in order from the object side to the image side, a first lens group G1 of positive refracting power, a second lens group G2 of negative refracting power, and a third lens group G3 of positive refracting power. The optical system also includes an aperture stop S interposed between the first lens group G1 and the second lens group G2.

The first lens group G1 is made up of, in order from the object side, a double-convex positive lens L11, and a cemented lens SU11 of a double-convex positive lens L12 and a double-concave negative lens L13.

The second lens group G2 is made up of, in order from the object side, a positive meniscus lens L21 convex on its object side and a negative meniscus lens L22 convex on its object side.

The third lens group G3 is comprised of a front lens subgroup G3F of positive refracting power, and a rear lens subgroup G3R of negative refracting power. The front lens subgroup G3F is made up of a double-convex positive lens L31 and a double-convex positive lens L32, whereas the rear lens subgroup G3R is made up of a double-concave negative lens L33.

The first lens group G1 and the third lens group G3 remain constantly fixed. The second lens group G2 moves toward the image side upon focusing from infinity to a close-range object.

Figure 7:
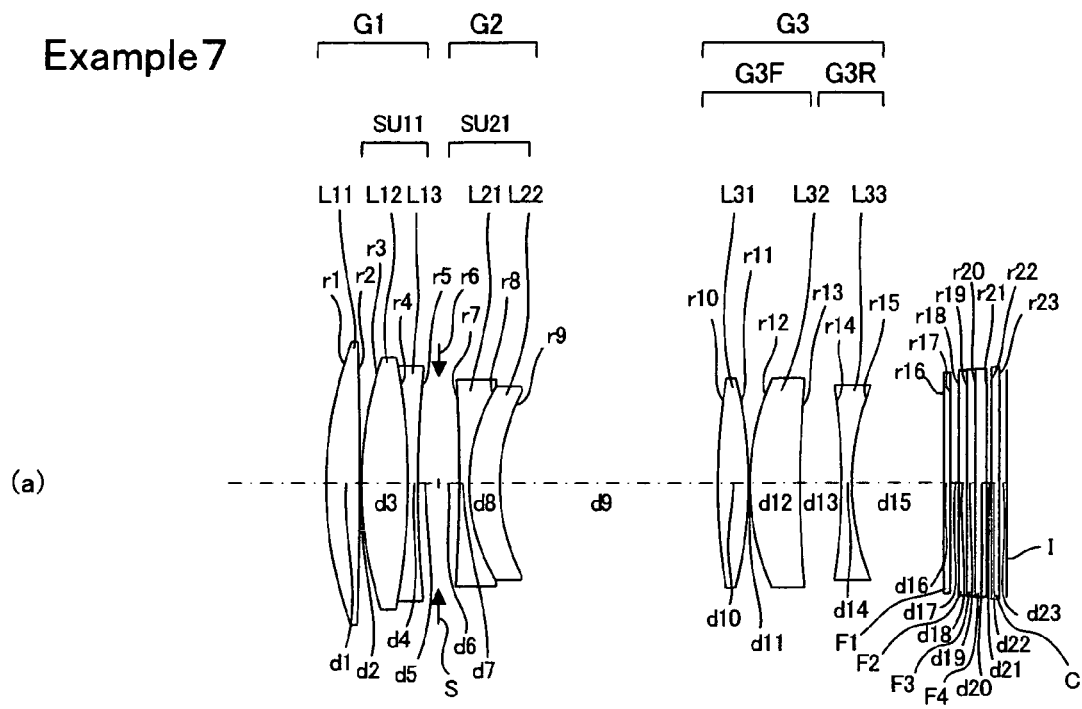
FIG. 7 is illustrative in section of the optical system of Example 7.
Figure 7:
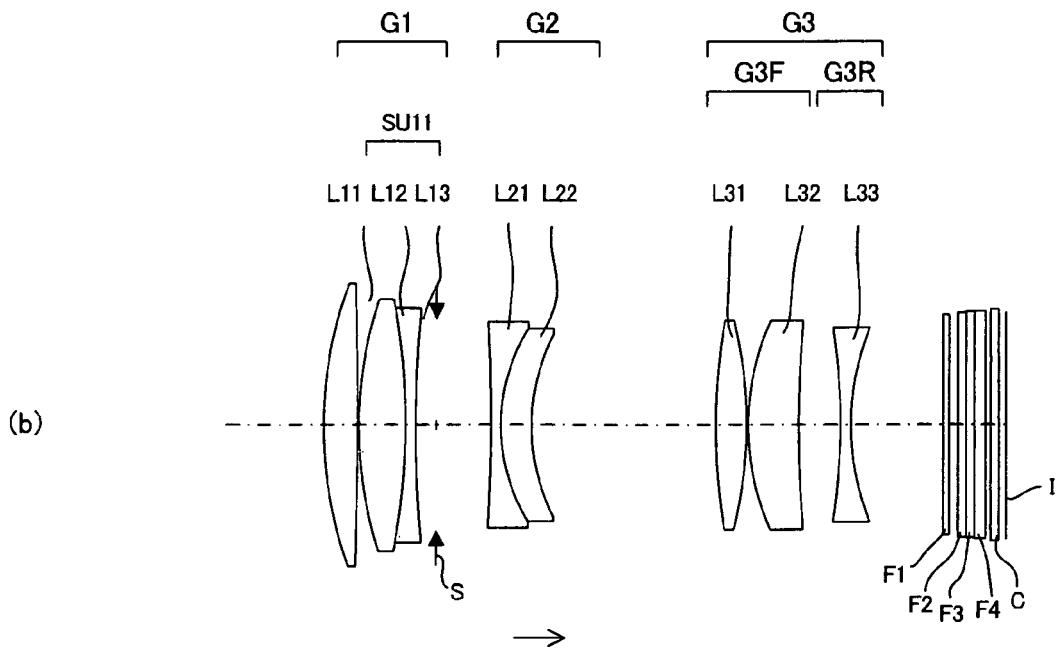

FIG. 7 is a sectional view of the optical system according to Example 7. More specifically, FIG. 7(a) is a sectional view of the optical system of Example 7 upon focusing at infinity, and FIG. 7(b) is a sectional view of the optical system of Example 7 upon close-range focusing.

As depicted in FIG. 7, the optical system of Example 7 is built up of, in order from the object side to the image side, a first lens group G1 of positive refracting power, a second lens group G2 of negative refracting power, and a third lens group G3 of positive refracting power. The optical system also includes an aperture stop S interposed between the first lens group G1 and the second lens group G2.

The first lens group G1 is made up of, in order from the object side, a double-convex positive lens L11, and a cemented lens SU11 of a double-convex positive lens L12 and a double-concave negative lens L13.

The second lens group G2 is made up of a cemented lens of a double-concave negative lens L21 and a positive meniscus lens L22 convex on its object side in order from the object side.

The third lens group G3 is comprised of a front lens subgroup G3F of positive refracting power, and a rear lens subgroup G3R of negative refracting power. The front lens subgroup G3F is made up of a double-convex positive lens L31 and a positive meniscus lens L32 convex on its object side, whereas the rear lens subgroup G3R is made up of a double-concave negative lens L33.

The first lens group G1 and the third lens group G3 remain constantly fixed. The second lens group G2 moves toward the image side upon focusing from infinity to a close-range object.

Figure 8:
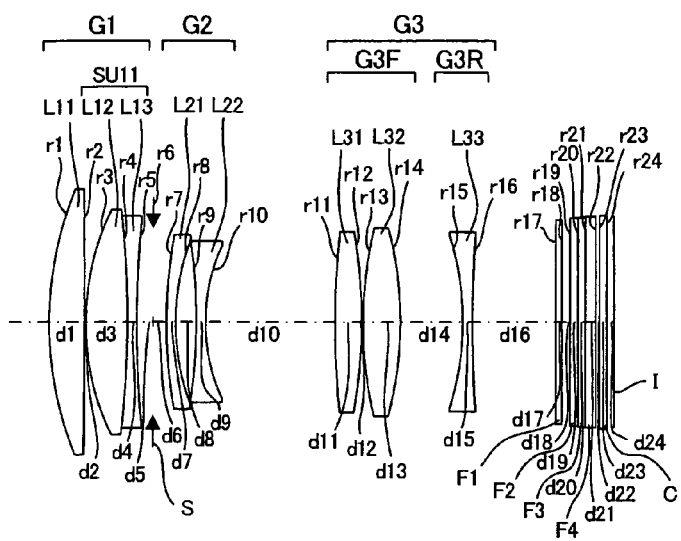
FIG. 8 is illustrative in section of the optical system of Example 8.
Figure 8:
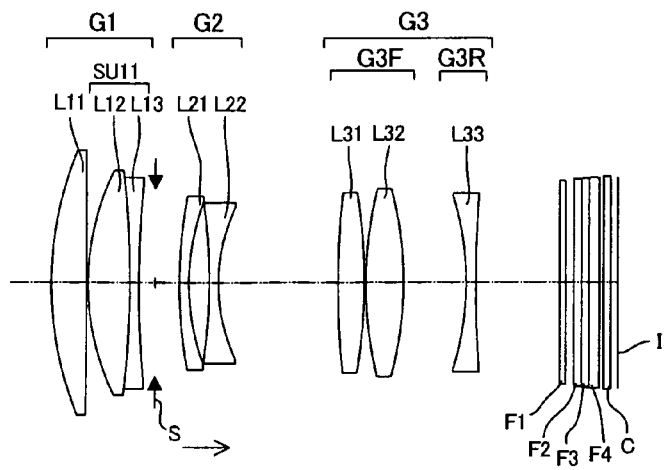

FIG. 8 is a sectional view of the optical system according to Example 8. More specifically, FIG. 8(a) is a sectional view of the optical system of Example 8 upon focusing at infinity, and FIG. 8(b) is a sectional view of the optical system of Example 8 upon close-range focusing.

As depicted in FIG. 8, the optical system of Example 8 is built up of, in order from the object side to the image side, a first lens group G1 of positive refracting power, a second lens group G2 of negative refracting power, and a third lens group G3 of positive refracting power. The optical system also includes an aperture stop S interposed between the first lens group G1 and the second lens group G2.

The first lens group G1 is made up of, in order from the object side, a double-convex positive lens L11, and a cemented lens SU11 of a double-convex positive lens L12 and a double-concave negative lens L13.

The second lens group G2 is made up of, in order from the object side, a negative meniscus lens L21 convex on its object side and a double-concave negative lens L22.

The third lens group G3 is comprised of a front lens subgroup G3F of positive refracting power, and a rear lens subgroup G3R of negative refracting power. The front lens subgroup G3F is made up of a double-convex positive lens L31 and a double-convex positive lens L32, whereas the rear lens subgroup G3R is made up of a double-concave negative lens L33.

The first lens group G1 and the third lens group G3 remain constantly fixed. The second lens group G2 moves toward the image side upon focusing from infinity to a close-range object.

Figure 9:
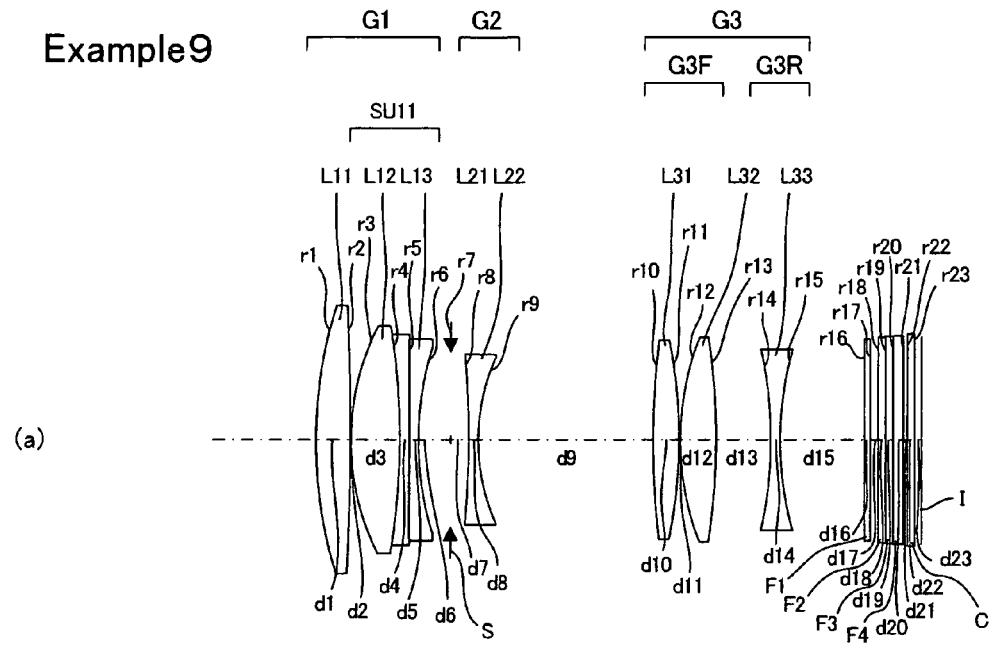
FIG. 9 is illustrative in section of the optical system of Example 9.
Figure 9:
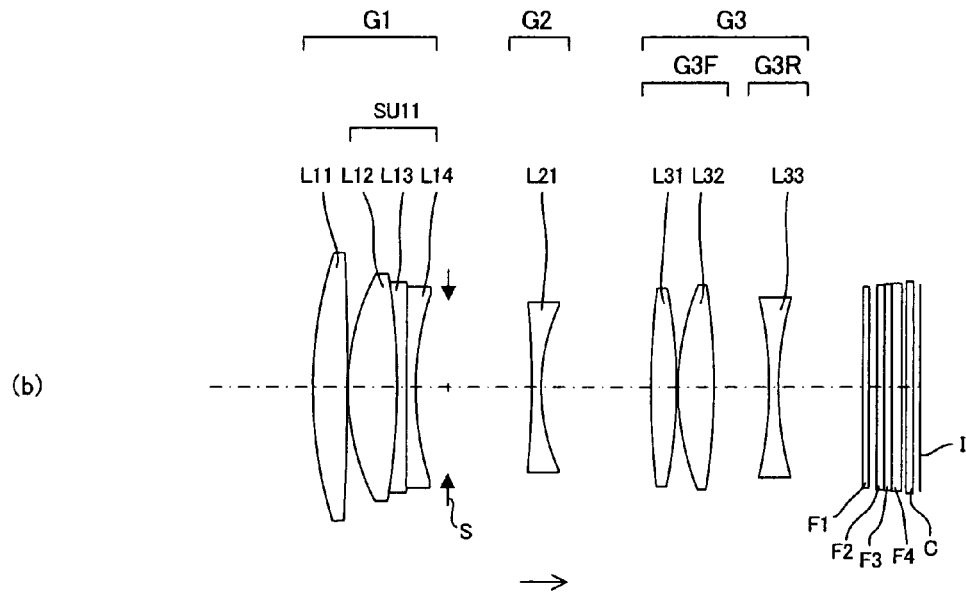

FIG. 9 is a sectional view of the optical system according to Example 9. More specifically, FIG. 9(a) is a sectional view of the optical system of Example 9 upon focusing at infinity, and FIG. 9(b) is a sectional view of the optical system of Example 9 upon close-range focusing.

As depicted in FIG. 9, the optical system of Example 9 is built up of, in order from the object side to the image side, a first lens group G1 of positive refracting power, a second lens group G2 of negative refracting power, and a third lens group G3 of positive refracting power. The optical system also includes an aperture stop S interposed between the first lens group G1 and the second lens group G2.

The first lens group G1 is made up of, in order from the object side, a double-convex positive lens L11, and a cemented lens SU11 of a double-convex positive lens L12, a negative meniscus lens L13 convex on its image side and a double-concave negative lens L14.

The second lens group G3 is made up of one double-concave negative lens L21.

The third lens group G3 is comprised of a front lens subgroup G3F of positive refracting power, and a rear lens subgroup G3R of negative refracting power. The front lens subgroup G3F is made up of a double-convex positive lens L31 and a double-convex positive lens L32, whereas the rear lens subgroup G3R is made up of a double-concave negative lens L33.

The first lens group G1 and the third lens group G3 remain constantly fixed. The second lens group G2 moves toward the image side upon focusing from infinity to a close-range object.

Figure 10:
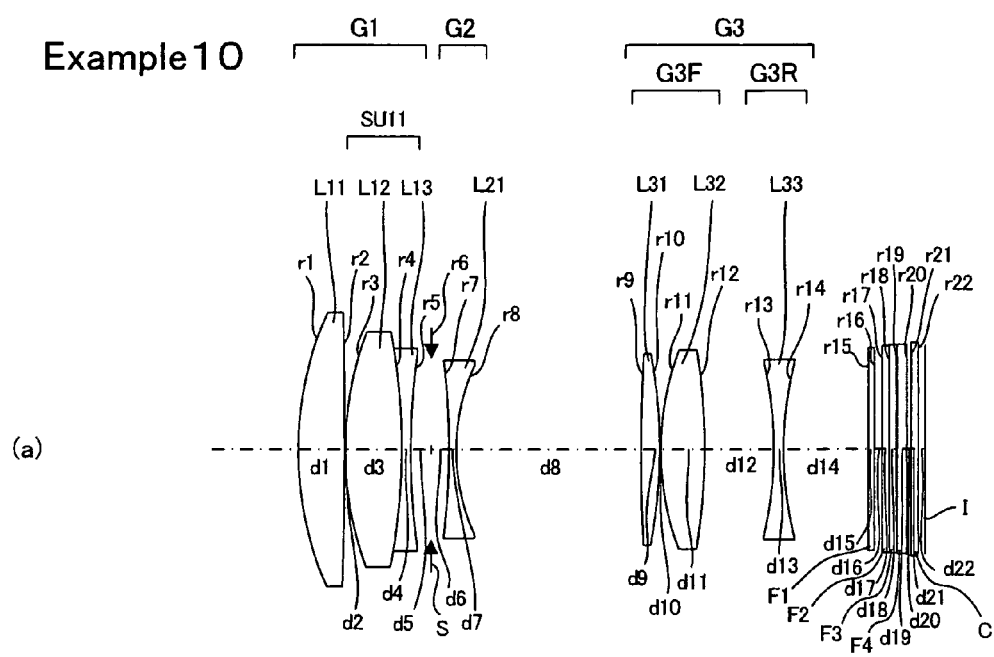
FIG. 10 is illustrative in section of the optical system of Example 10.
Figure 10:
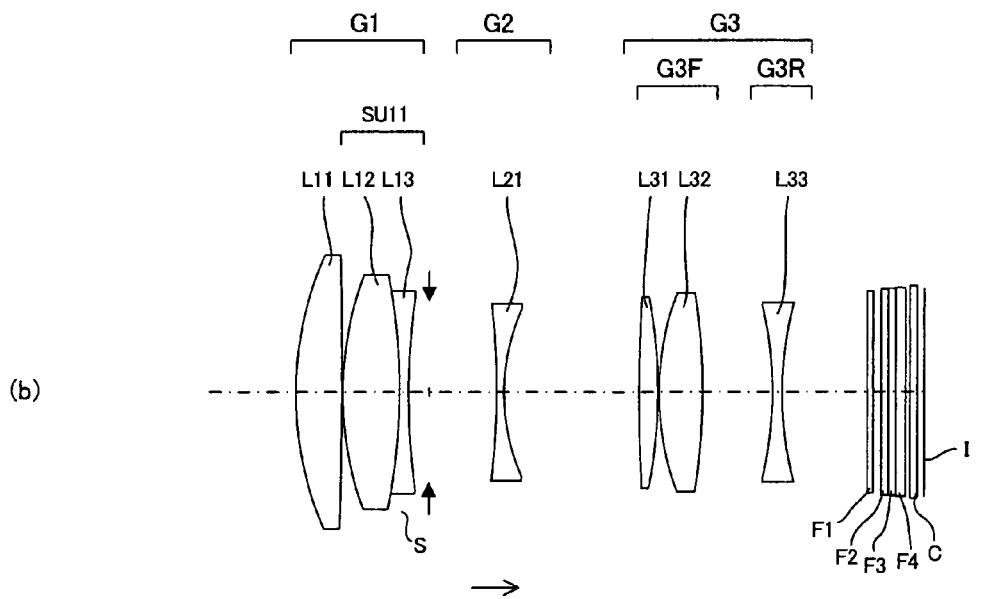
Figure 11:
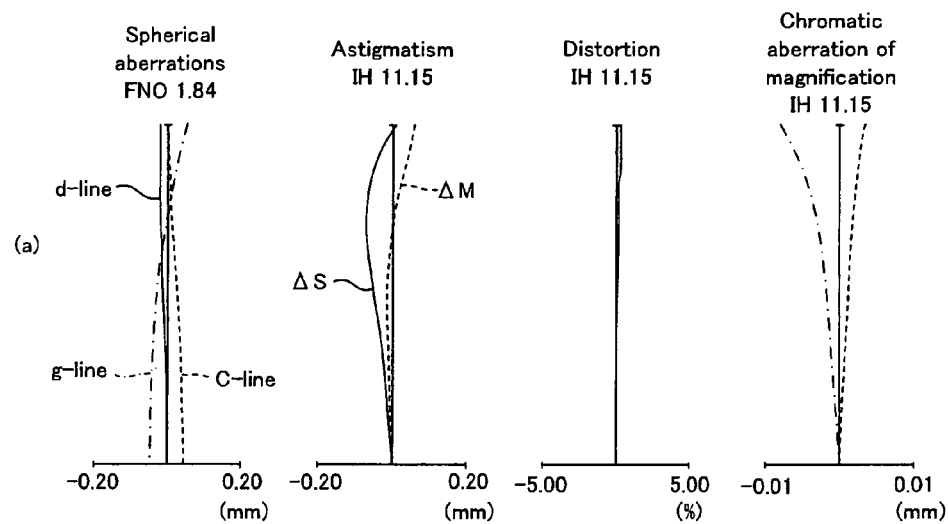
FIG. 11 is a diagram for aberrations of the optical system of Example 1 upon focusing at infinity.
Figure 11:
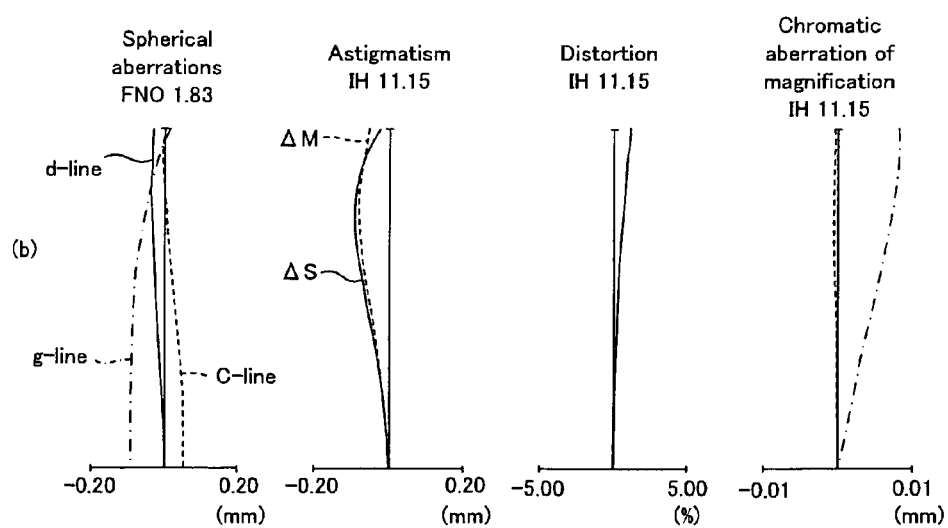
Figure 12:
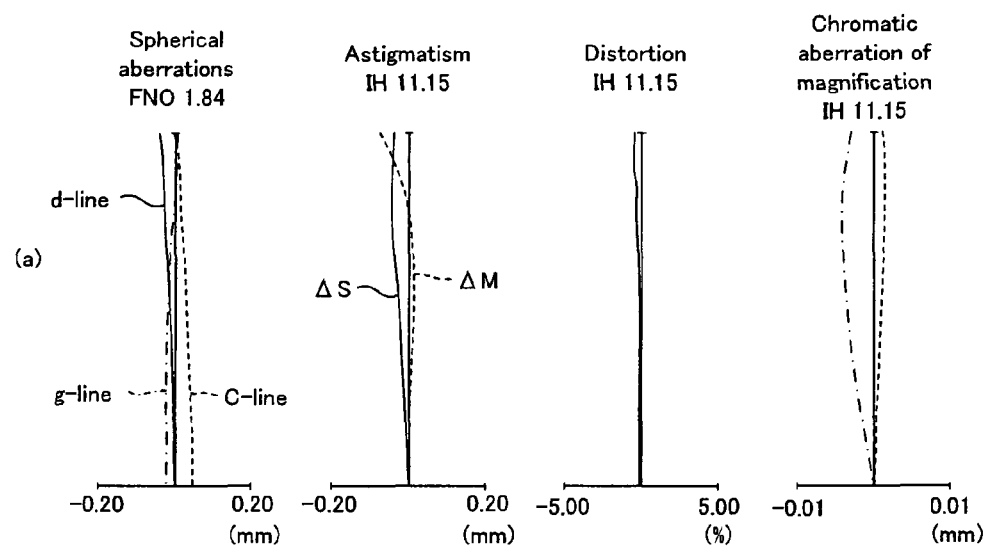
FIG. 12 is a diagram for aberrations of the optical system of Example 2 upon focusing at infinity.
Figure 12:
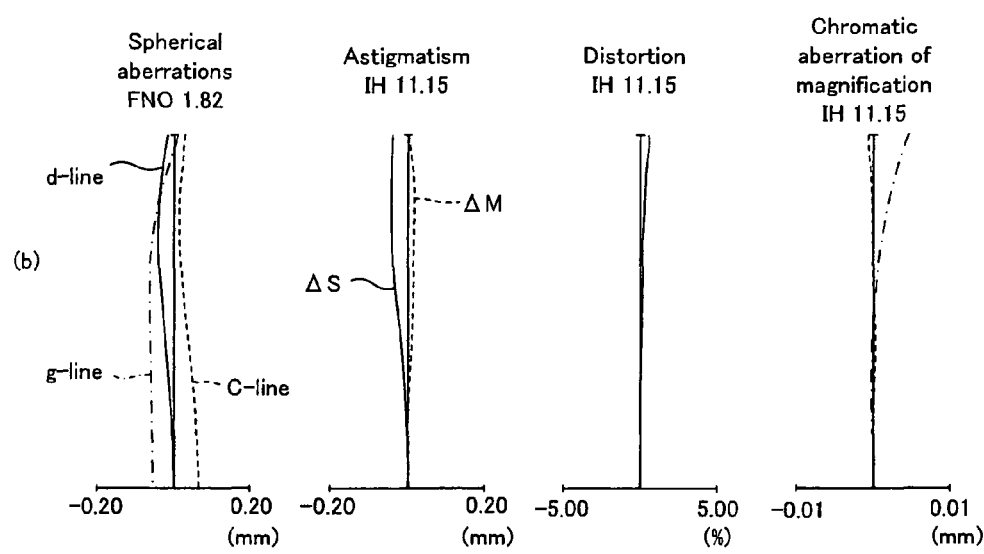
Figure 13:
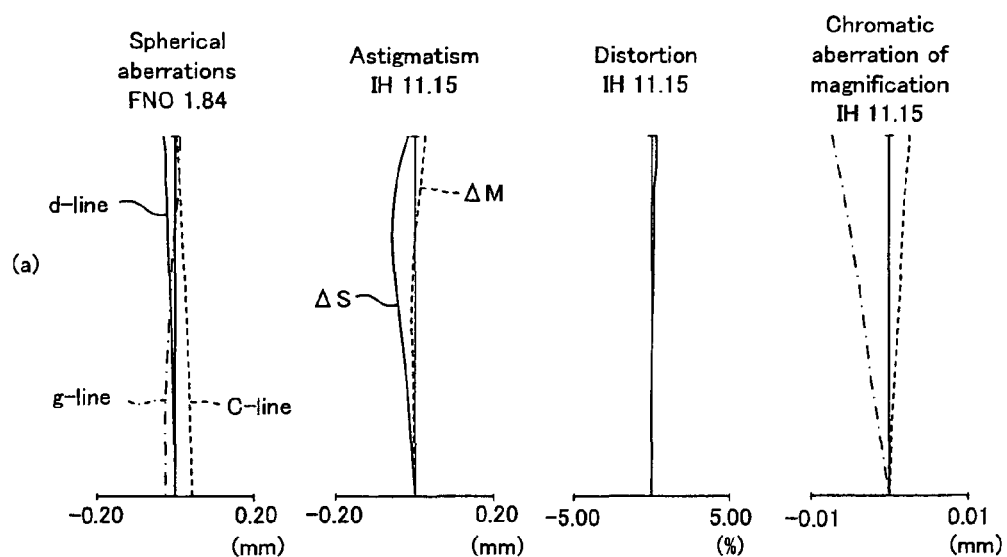
FIG. 13 is a diagram for aberrations of the optical system of Example 3 upon focusing at infinity.
Figure 13:
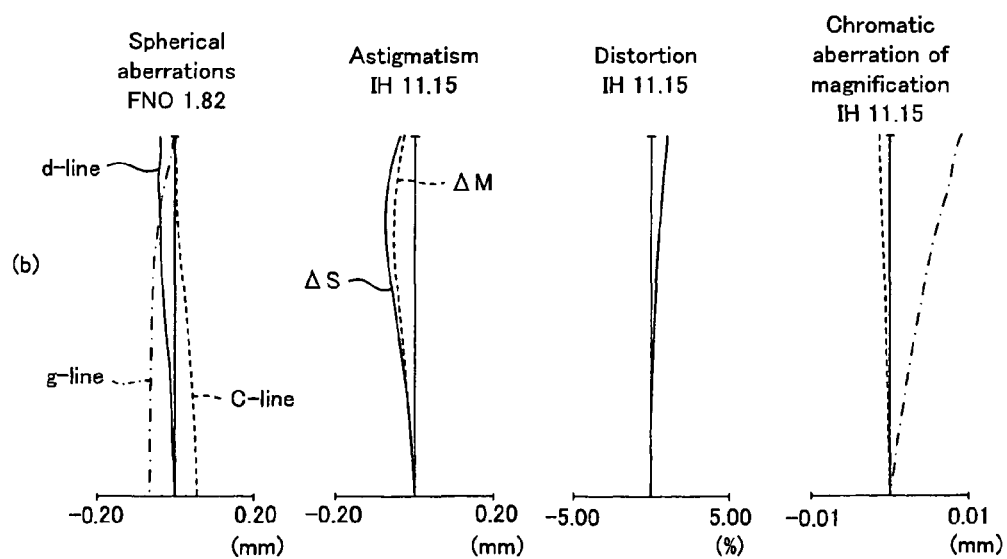
Figure 14:
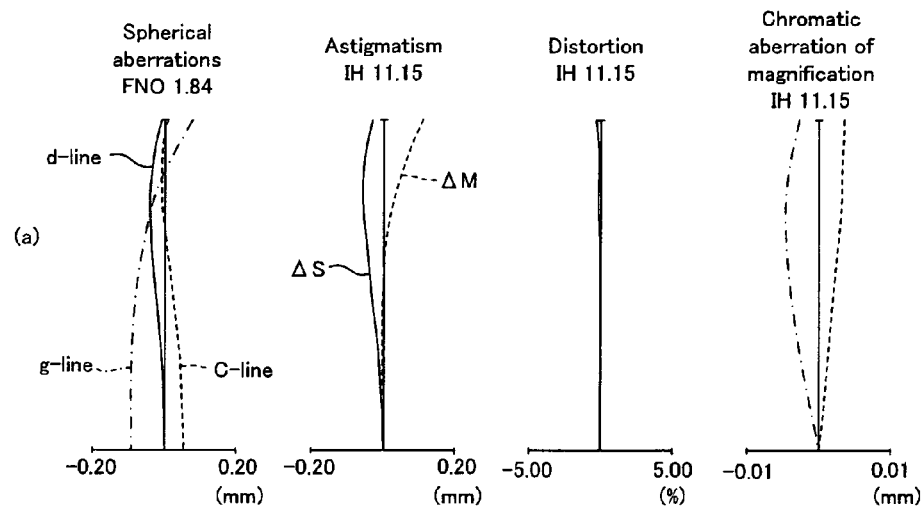
FIG. 14 is a diagram for aberrations of the optical system of Example 4 upon focusing at infinity.
Figure 14:
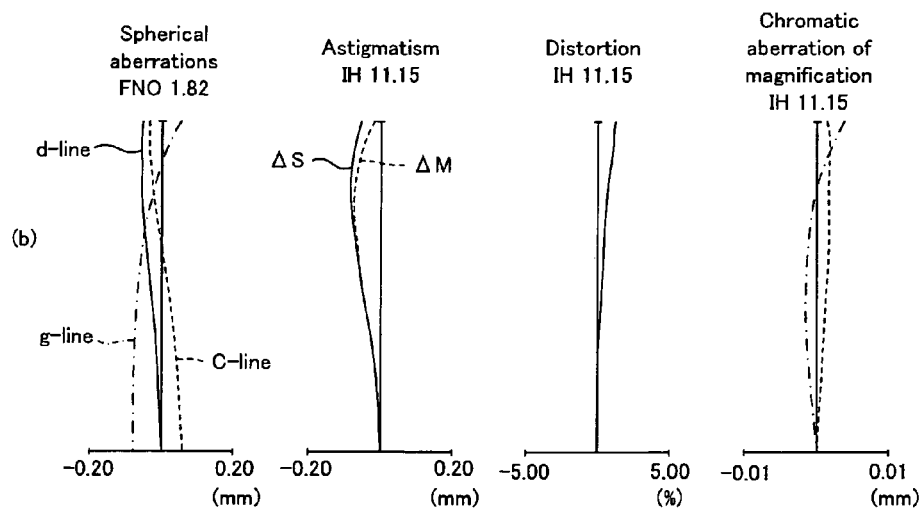
Figure 15:
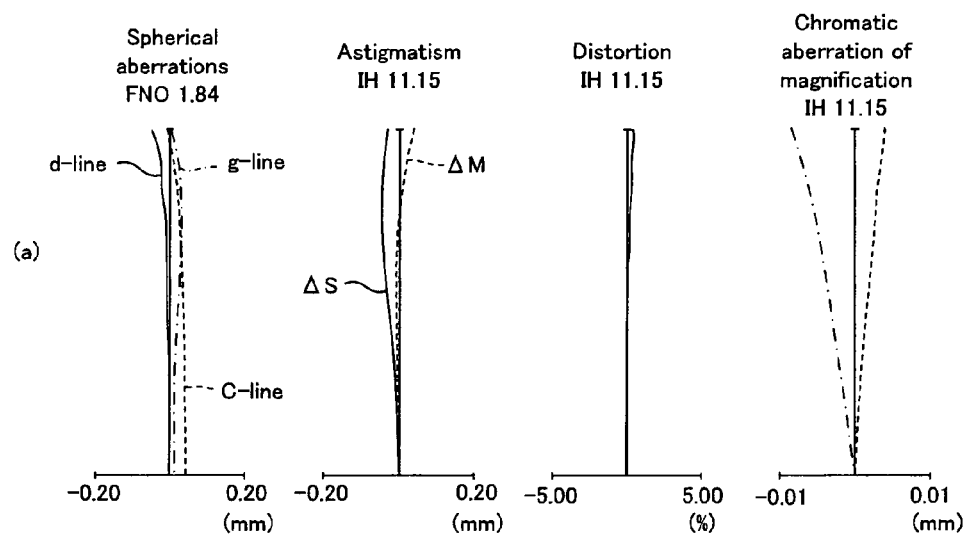
FIG. 15 is a diagram for aberrations of the optical system of Example 5 upon focusing at infinity.
Figure 15:
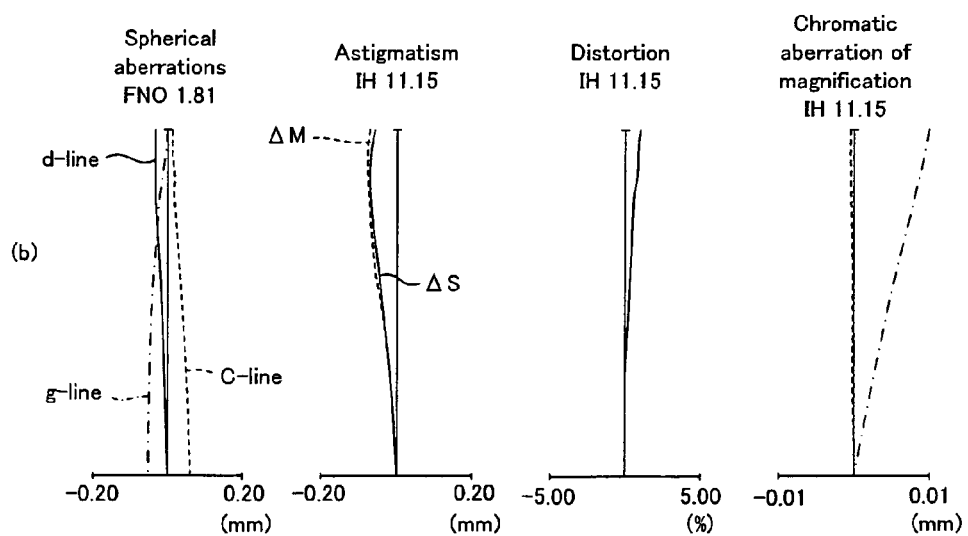
Figure 16:
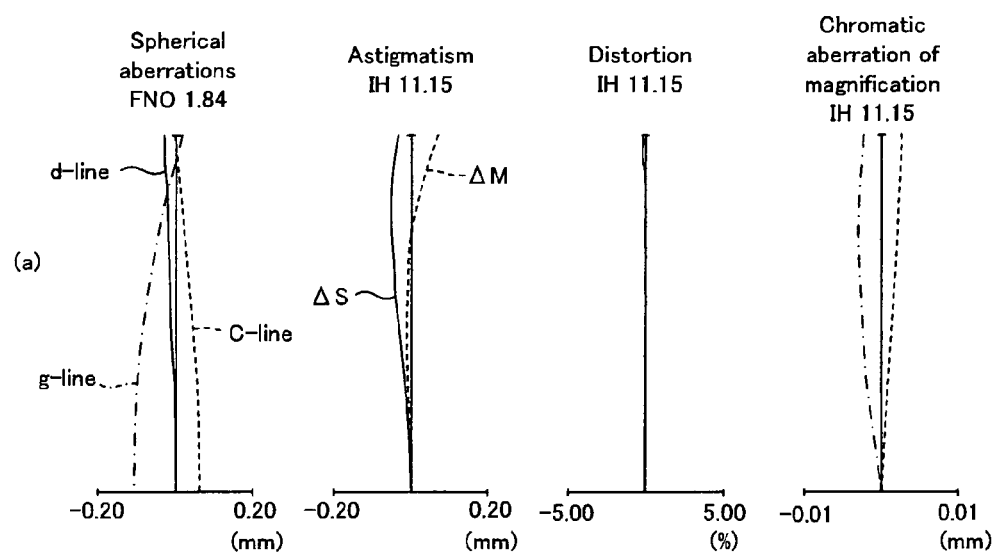
FIG. 16 is a diagram for aberrations of the optical system of Example 6 upon focusing at infinity.
Figure 16:
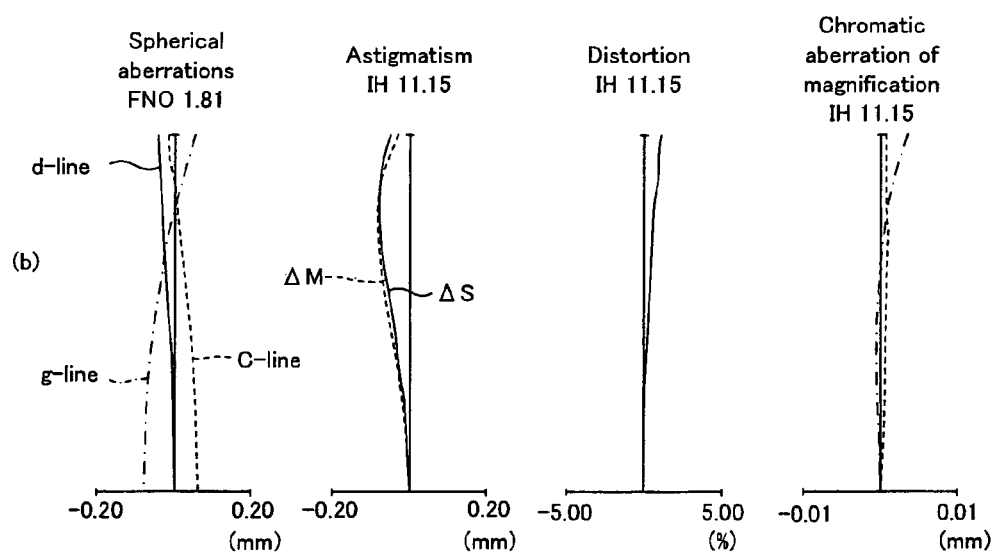
Figure 17:
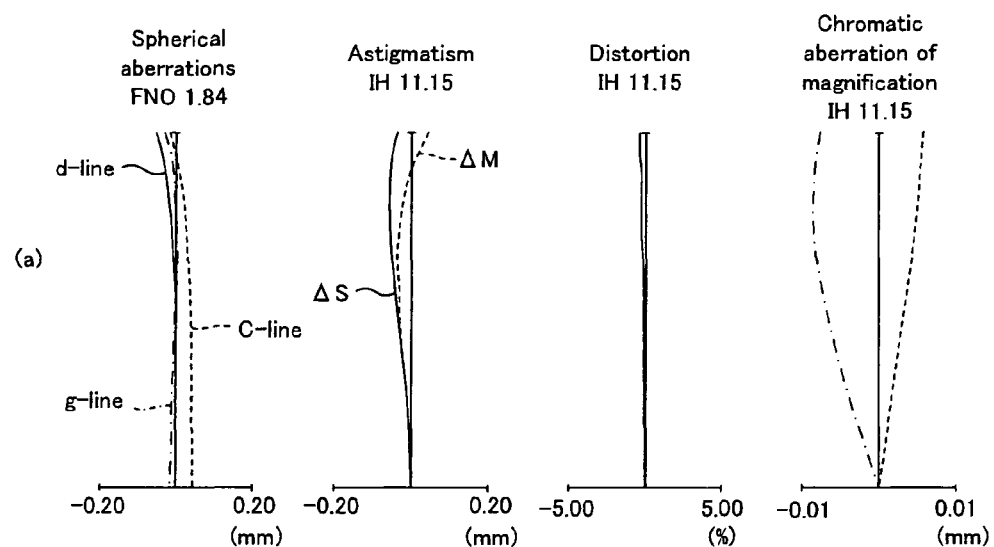
FIG. 17 is a diagram for aberrations of the optical system of Example 7 upon focusing at infinity.
Figure 17:
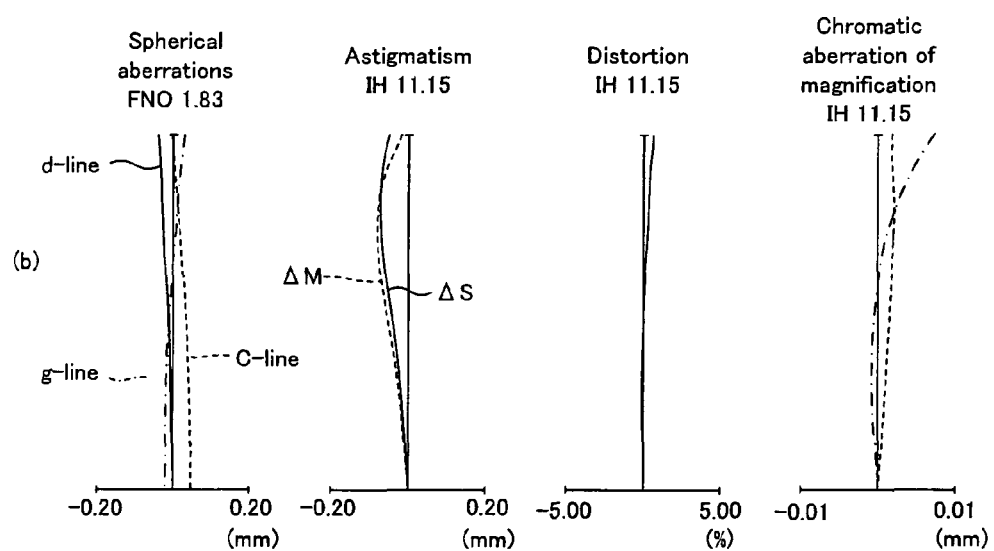
Figure 18:
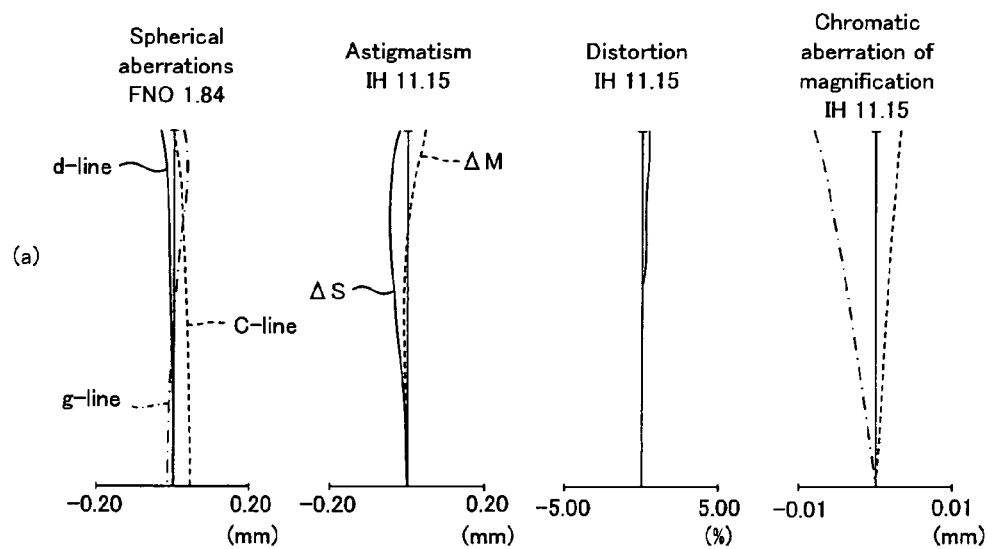
FIG. 18 is a diagram for aberrations of the optical system of Example 8 upon focusing at infinity.
Figure 18:
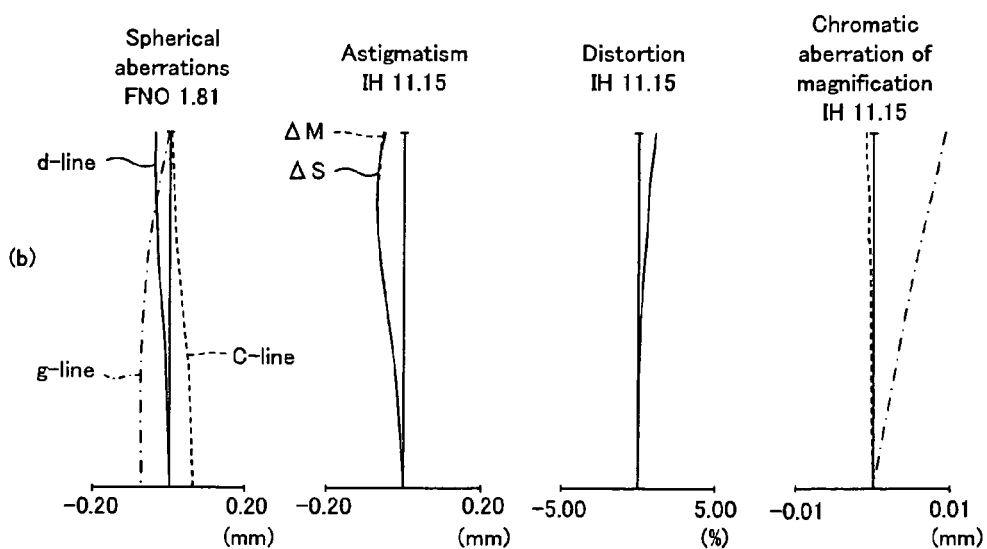
Figure 19:
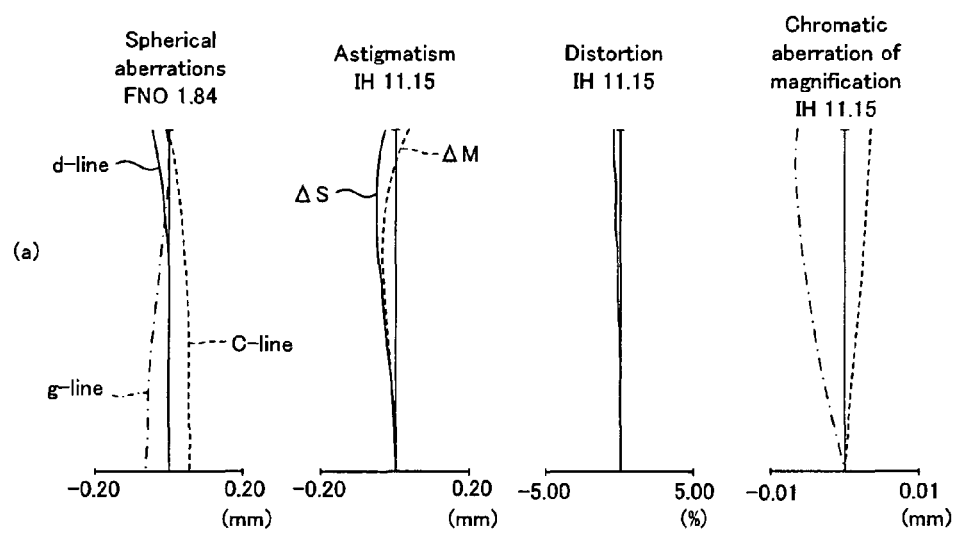
FIG. 19 is a diagram for aberrations of the optical system of Example 9 upon focusing at infinity.
Figure 19:
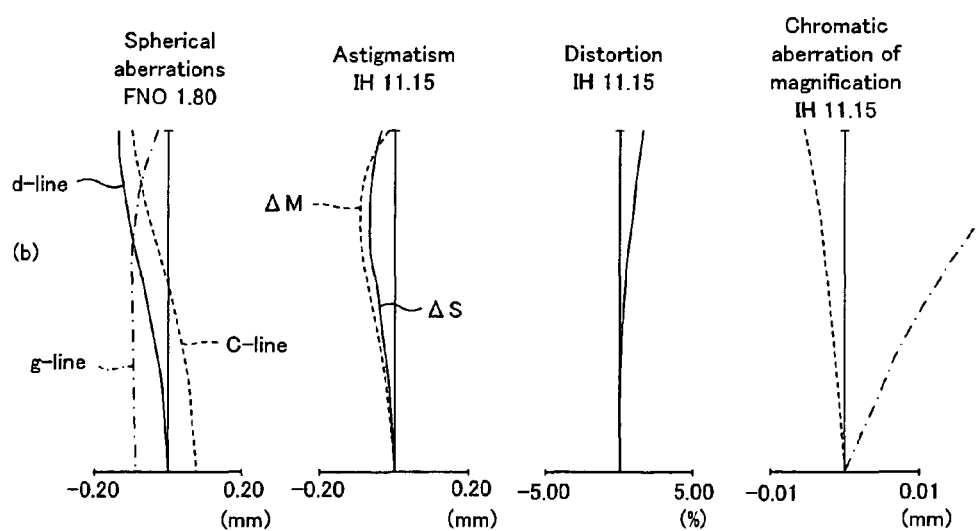
Figure 20:
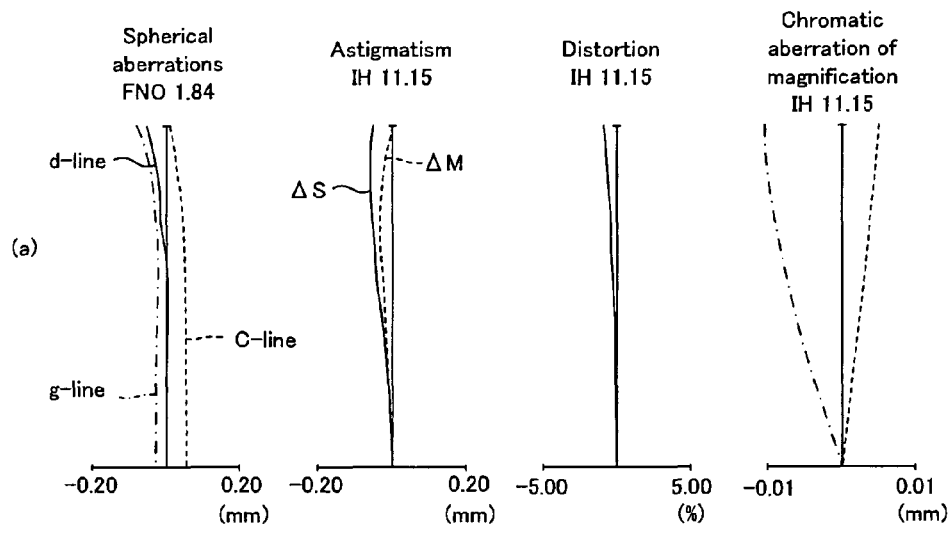
FIG. 20 is a diagram for aberrations of the optical system of Example 10 upon focusing at infinity.
Figure 20:
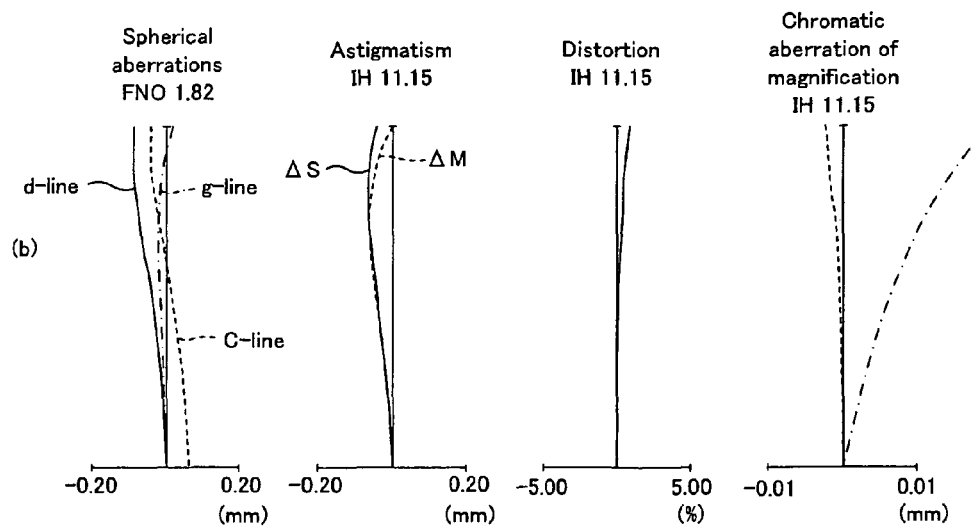

FIG. 10 is a sectional view of the optical system according to Example 10. More specifically, FIG. 10(a) is a sectional view of the optical system of Example 10 upon focusing at infinity, and FIG. 10(b) is a sectional view of the optical system of Example 10 upon close-range focusing.

As depicted in FIG. 10, the optical system of Example 10 is built up of, in order from the object side to the image side, a first lens group G1 of positive refracting power, a second lens group G2 of negative refracting power, and a third lens group G3 of positive refracting power. The optical system also includes an aperture stop S interposed between the first lens group G1 and the second lens group G2.

The first lens group G1 is made up of, in order from the object side, a double-convex positive lens L11, and a cemented lens SU11 of a double-convex positive lens L12 and a double-concave negative lens L13.

The second lens group G2 is made up of one double-concave negative lens L21.

The third lens group G3 is comprised of a front lens subgroup G3F of positive refracting power, and a rear lens subgroup G3R of negative refracting power. The front lens subgroup G3F is made up of a double-convex positive lens L31 and a double-convex positive lens L32, whereas the rear lens subgroup G3R is made up of a double-concave negative lens L33.

The first lens group G1 and the third lens group G3 remain constantly fixed. The second lens group G2 moves toward the image side upon focusing from infinity to a close-range object.

Given below are numeral data on Examples 1 to 10, in which r is the radius of curvature of a lens surface, d is a lens thickness or air separation, nd and vd are a refractive index and an Abbe constant on a d-line ($\lambda$=587.6 nm) basis, f is a focal length, Fno is an F-number, ω is a half angle of view (°), fb (in air) is a back focus as calculated on an air basis, and IH is an image height.

NUMERAL EXAMPLE 1

Unit mm

Surface Data

| Surface No. | r | d | nd | vd |
|---|---|---|---|---|
| 1 | 37.765 | 3.43 | 1.81600 | 46.62 |
| 2 | 4789.512 | 0.10 | | |
| 3 | 22.665 | 5.15 | 1.59282 | 68.63 |
| 4 | −68.251 | 1.00 | 2.00069 | 25.46 |
| 5 | 360.227 | 1.33 | | |
| 6 (Stop) | ∞ | d6 | | |
| 7 | 108.885 | 1.00 | 1.59270 | 35.31 |
| 8 | 21.893 | 1.78 | | |
| 9 | −67.118 | 0.99 | 1.51823 | 58.90 |
| 10 | 17.207 | d10 | | |
| 11 | 67.696 | 2.46 | 1.77250 | 49.60 |
| 12 | −50.277 | 0.10 | | |
| 13 | 39.865 | 3.67 | 1.59282 | 68.63 |
| 14 | −32.036 | 3.54 | | |
| 15 | −27.971 | 1.00 | 1.59270 | 35.31 |
| 16 | 102.879 | 8.99 | | |
| 17 | ∞ | 0.65 | 1.51633 | 64.14 |
| 18 | ∞ | 0.85 | | |
| 19 | ∞ | 0.82 | 1.54424 | 70.86 |
| 20 | ∞ | 0.76 | 1.51300 | 61.08 |
| 21 | ∞ | 1.08 | 1.54424 | 70.86 |
| 22 | ∞ | 0.45 | | |
| 23 | ∞ | 0.80 | 1.50700 | 63.38 |
| 24 | ∞ | 0.75 | | |
| Image Plane | ∞ | | | |

| | Infinity | Close-Range |
|---|---|---|
| d6 | 1.38 | 2.21 |
| d10 | 10.16 | 9.33 |

Various Data

| | | |
|---|---|---|
| f | 39.52 | 39.26 |
| Fno | 1.84 | 1.83 |
| 2ω (Angle of View (°)) | 31.41 | 30.00 |
| fb (in air) | 13.72 | |
| Full Length (in air) | 50.80 | |
| IH | 11.15 | |

Focal Length of Each Lens Group

| | |
|---|---|
| 1st Lens Group | 25.33 |
| 2nd Lens Group | −16.32 |
| 3rd Lens Group | 25.46 |
| Distance between Object Images upon Close-Range Focusing | 85 cm |

NUMERAL EXAMPLE 2

Unit mm

Surface Data

| Surface No. | r | d | nd | vd |
|---|---|---|---|---|
| 1 | 48.872 | 3.96 | 1.81600 | 46.62 |
| 2 | −590.823 | 0.10 | | |
| 3 | 21.656 | 3.50 | 1.60311 | 60.64 |
| 4 | 35.232 | 2.46 | | |
| 5 | 140.222 | 1.00 | 1.64769 | 33.79 |
| 6 | 17.832 | 5.47 | | |
| 7 | −22.616 | 1.00 | 1.58144 | 40.75 |
| 8 | 89.969 | 2.05 | | |
| 9 (Stop) | ∞ | 2.01 | | |
| 10 | −178.438 | 3.03 | 1.77250 | 49.60 |
| 11 | −25.617 | d11 | | |
| 12 | 22.919 | 3.50 | 1.45650 | 90.27 |
| 13 | 328.581 | d13 | | |
| 14 | −127.951 | 3.20 | 1.80000 | 29.84 |
| 15 | 67.776 | 3.43 | 1.77250 | 49.60 |
| 16 | −34.180 | 6.45 | | |
| 17 | −16.934 | 1.00 | 1.51742 | 52.43 |
| 18 | −33.850 | 8.99 | | |
| 19 | ∞ | 0.65 | 1.51633 | 64.14 |
| 20 | ∞ | 0.85 | | |
| 21 | ∞ | 0.82 | 1.54424 | 70.86 |
| 22 | ∞ | 0.76 | 1.51300 | 61.08 |
| 23 | ∞ | 1.08 | 1.54424 | 70.86 |
| 24 | ∞ | 0.45 | | |
| 25 | ∞ | 0.80 | 1.50700 | 63.38 |
| 26 | ∞ | 0.75 | | |
| Image Plane | ∞ | | | |

| | Infinity | Close-Range |
|---|---|---|
| d11 | 3.73 | 0.29 |
| d13 | 11.88 | 15.33 |

Various Data

| | | |
|---|---|---|
| f | 44.78 | 44.52 |
| Fno | 1.84 | 1.82 |
| 2ω (Angle of View (°)) | 28.07 | 26.38 |
| fb (in air) | 13.73 | |
| Full Length (in air) | 71.50 | |
| IH | 11.15 | |

Focal Length of Each Lens Group

| | |
|---|---|
| 1st Lens Group | 237.50 |
| 2nd Lens Group | 53.78 |
| 3rd Lens Group | 387.12 |
| Distance between Object Images upon Close-Range Focusing | 85 cm |

NUMERAL EXAMPLE 3

Unit mm

Surface Data

| Surface No. | r | d | nd | vd |
|---|---|---|---|---|
| 1 | 34.809 | 3.78 | 1.81600 | 46.62 |
| 2 | −907.405 | 0.10 | | |
| 3 | 26.975 | 4.19 | 1.59282 | 68.63 |
| 4 | −106.315 | 1.00 | 2.00069 | 25.46 |
| 5 | 80.103 | 1.90 | | |
| 6 (Stop) | ∞ | d6 | | |
| 7 | 32.930 | 1.00 | 1.59270 | 35.31 |
| 8 | 20.677 | 2.43 | | |
| 9 | −46.936 | 0.99 | 1.51633 | 64.14 |
| 10 | 19.852 | d10 | | |
| 11 | −933.621 | 1.94 | 1.77250 | 49.60 |
| 12 | −44.683 | 0.10 | | |
| 13 | 32.400 | 3.85 | 1.59282 | 68.63 |
| 14 | −37.244 | 6.17 | | |
| 15 | −30.511 | 1.00 | 1.63980 | 34.46 |
| 16 | 162.770 | 8.99 | | |
| 17 | ∞ | 0.65 | 1.51633 | 64.14 |
| 18 | ∞ | 0.85 | | |
| 19 | ∞ | 0.82 | 1.54424 | 70.86 |
| 20 | ∞ | 0.76 | 1.51300 | 61.08 |
| 21 | ∞ | 1.08 | 1.54424 | 70.86 |

-continued

Unit mm

| | | | | |
|---|---|---|---|---|
| 22 | ∞ | 0.45 | | |
| 23 | ∞ | 0.80 | 1.50700 | 63.38 |
| 24 | ∞ | 0.75 | | |
| Image Plane | ∞ | | | |

| | Infinity | Close-Range |
|---|---|---|
| d6 | 1.39 | 2.69 |
| d10 | 11.60 | 10.29 |

Various Data

| | | |
|---|---|---|
| f | 44.23 | 43.80 |
| Fno | 1.84 | 1.82 |
| 2ω (Angle of View (°)) | 28.21 | 26.74 |
| fb (in air) | 13.72 | |
| Full Length (in air) | 55.17 | |
| IH | 11.15 | |

Focal Length of Each Lens Group

| | |
|---|---|
| 1st Lens Group | 31.39 |
| 2nd Lens Group | −20.73 |
| 3rd Lens Group | 29.24 |
| Distance between Object Images upon Close-Range Focusing | 85 cm |

NUMERAL EXAMPLE 4

Unit mm

Surface Data

| Surface No. | r | d | nd | vd |
|---|---|---|---|---|
| 1 | 71.959 | 2.27 | 1.81600 | 46.62 |
| 2 | −2188.347 | 0.10 | | |
| 3 | 44.474 | 4.55 | 1.59282 | 68.63 |
| 4 | −56.489 | 1.00 | 1.80518 | 25.42 |
| 5 | 278.334 | 1.65 | | |
| 6 (Stop) | ∞ | d6 | | |
| 7 | 14.646 | 2.19 | 1.90366 | 31.32 |
| 8 | 16.586 | 2.18 | | |
| 9 | 40.144 | 0.99 | 1.81600 | 46.62 |
| 10 | 15.230 | d10 | | |
| 11 | 91.406 | 2.27 | 1.77250 | 49.60 |
| 12 | −62.593 | 0.20 | | |
| 13 | 24.430 | 4.297 | 1.59282 | 68.63 |
| 14 | −70.331 | 3.18 | | |
| 15 | −47.825 | 1.00 | 1.59270 | 35.31 |
| 16 | 20.749 | 8.99 | | |
| 17 | ∞ | 0.65 | 1.51633 | 64.14 |
| 18 | ∞ | 0.85 | | |
| 19 | ∞ | 0.82 | 1.54424 | 70.86 |
| 20 | ∞ | 0.76 | 1.51300 | 61.08 |
| 21 | ∞ | 1.08 | 1.54424 | 70.86 |
| 22 | ∞ | 0.45 | | |
| 23 | ∞ | 0.80 | 1.50700 | 63.38 |
| 24 | ∞ | 0.75 | | |
| Image Plane | ∞ | | | |

| | Infinity | Close-Range |
|---|---|---|
| d6 | 1.38 | 5.98 |
| d10 | 21.38 | 16.78 |

Various Data

| | | |
|---|---|---|
| f | 46.81 | 46.28 |
| Fno | 1.84 | 1.82 |
| 2ω (Angle of View (°)) | 26.85 | 25.30 |
| fb (in air) | 13.72 | |
| Full Length (in air) | 62.36 | |
| IH | 11.15 | |

-continued

Unit mm

Focal Length of Each Lens Group

| | |
|---|---|
| 1st Lens Group | 53.22 |
| 2nd Lens Group | −55.12 |
| 3rd Lens Group | 41.74 |
| Distance between Object Images upon Close-Range Focusing | 85 cm |

NUMERAL EXAMPLE 5

Unit mm

Surface Data

| Surface No. | r | d | nd | vd |
|---|---|---|---|---|
| 1 | 41.881 | 4.04 | 1.81600 | 46.62 |
| 2 | −585.377 | 0.10 | | |
| 3 | 30.078 | 4.81 | 1.59282 | 68.63 |
| 4 | −105.483 | 1.00 | 2.00069 | 25.46 |
| 5 | 124.383 | 1.76 | | |
| 6 (Stop) | ∞ | d6 | | |
| 7 | 49.317 | 1.00 | 1.59270 | 35.31 |
| 8 | 28.403 | 2.24 | | |
| 9 | −65.163 | 0.99 | 1.51742 | 52.43 |
| 10 | 21.202 | d10 | | |
| 11 | 61.511 | 3.13 | 1.77250 | 49.60 |
| 12 | −58.914 | 0.10 | | |
| 13 | 50.956 | 3.37 | 1.59282 | 68.63 |
| 14 | −57.226 | 7.18 | | |
| 15 | −34.734 | 1.00 | 1.85026 | 32.27 |
| 16 | 114.221 | 8.98 | | |
| 17 | ∞ | 0.65 | 1.51633 | 64.14 |
| 18 | ∞ | 0.85 | | |
| 19 | ∞ | 0.82 | 1.54424 | 70.86 |
| 20 | ∞ | 0.76 | 1.51300 | 61.08 |
| 21 | ∞ | 1.08 | 1.54424 | 70.86 |
| 22 | ∞ | 0.45 | | |
| 23 | ∞ | 0.80 | 1.50700 | 63.38 |
| 24 | ∞ | 0.75 | | |
| Image Plane | ∞ | | | |

| | Infinity | Close-Range |
|---|---|---|
| d6 | 1.38 | 2.89 |
| d10 | 16.58 | 15.07 |

Various Data

| | | |
|---|---|---|
| f | 49.00 | 48.03 |
| Fno | 1.84 | 1.81 |
| 2ω (Angle of View (°)) | 25.53 | 24.20 |
| fb (in air) | 13.71 | |
| Full Length (in air) | 62.40 | |
| IH | 11.15 | |

Focal Length of Each Lens Group

| | |
|---|---|
| 1st Lens Group | 33.52 |
| 2nd Lens Group | −23.99 |
| 3rd Lens Group | 35.65 |

NUMERAL EXAMPLE 6

Unit mm

Surface Data

| Surface No. | r | d | nd | νd |
|---|---|---|---|---|
| 1 | 62.734 | 2.67 | 1.81600 | 46.62 |
| 2 | −695.249 | 0.10 | | |
| 3 | 39.109 | 4.43 | 1.59282 | 68.63 |
| 4 | −77.930 | 1.00 | 1.84666 | 23.78 |
| 5 | 117.525 | 2.43 | | |
| 6 (Stop) | ∞ | d6 | | |
| 7 | 15.591 | 2.13 | 1.80518 | 25.42 |
| 8 | 16.298 | 3.24 | | |
| 9 | 88.222 | 1.00 | 1.64000 | 60.08 |
| 10 | 17.346 | d10 | | |
| 11 | 101.936 | 2.19 | 1.77250 | 49.60 |
| 12 | −64.487 | 0.10 | | |
| 13 | 27.238 | 4.08 | 1.59282 | 68.63 |
| 14 | −67.099 | 4.39 | | |
| 15 | −49.982 | 1.00 | 1.85026 | 32.27 |
| 16 | 27.903 | 8.99 | | |
| 17 | ∞ | 0.65 | 1.51633 | 64.14 |
| 18 | ∞ | 0.85 | | |
| 19 | ∞ | 0.82 | 1.54424 | 70.86 |
| 20 | ∞ | 0.76 | 1.51300 | 61.08 |
| 21 | ∞ | 1.08 | 1.54424 | 70.86 |
| 22 | ∞ | 0.45 | | |
| 23 | ∞ | 0.80 | 1.50700 | 63.38 |
| 24 | ∞ | 0.75 | | |
| Image Plane | ∞ | | | |

| | Infinity | Close-Range |
|---|---|---|
| d6 | 1.39 | 5.32 |
| d10 | 18.75 | 14.83 |

Various Data

| | | |
|---|---|---|
| f | 48.89 | 48.08 |
| Fno | 1.84 | 1.81 |
| 2ω (Angle of View (°)) | 25.73 | 24.18 |
| fb (in air) | 13.73 | |
| Full Length (in air) | 62.63 | |
| IH | 11.15 | |

Focal Length of Each Lens Group

| | |
|---|---|
| 1st Lens Group | 50.75 |
| 2nd Lens Group | −45.86 |
| 3rd Lens Group | 40.97 |
| Distance between Object Images upon Close-Range Focusing | 85 cm |

NUMERAL EXAMPLE 7

Unit mm

Surface Data

| Surface No. | r | d | nd | νd |
|---|---|---|---|---|
| 1 | 42.023 | 3.30 | 1.81600 | 46.62 |
| 2 | −565.225 | 0.10 | | |
| 3 | 41.851 | 4.49 | 1.59282 | 68.62 |
| 4 | −71.032 | 1.00 | 2.00069 | 25.46 |
| 5 | 120.818 | 2.10 | | |
| 6 (Stop) | ∞ | d6 | | |
| 7 | −263.487 | 1.00 | 1.51742 | 52.43 |
| 8 | 18.674 | 3.00 | 1.80518 | 25.42 |
| 9 | 20.594 | d9 | | |
| 10 | 60.394 | 3.04 | 1.81600 | 46.62 |
| 11 | −45.960 | 0.10 | | |
| 12 | 26.632 | 4.91 | 1.59282 | 68.62 |
| 13 | 115.266 | 4.04 | | |
| 14 | −65.825 | 1.00 | 1.74077 | 27.79 |
| 15 | 26.799 | 9.00 | | |
| 16 | ∞ | 0.65 | 1.51633 | 64.14 |
| 17 | ∞ | 0.85 | | |
| 18 | ∞ | 0.82 | 1.54424 | 70.86 |
| 19 | ∞ | 0.76 | 1.51300 | 61.08 |
| 20 | ∞ | 1.08 | 1.54424 | 70.86 |
| 21 | ∞ | 0.45 | | |
| 22 | ∞ | 0.80 | 1.50700 | 63.38 |
| 23 | ∞ | 0.75 | | |
| Image Plane | ∞ | | | |

| | Infinity | Close-Range |
|---|---|---|
| d6 | 1.91 | 5.27 |
| d9 | 21.41 | 18.06 |

Various Data

| | | |
|---|---|---|
| f | 46.63 | 46.22 |
| Fno | 1.84 | 1.83 |
| 2ω (Angle of View (°)) | 26.99 | 25.11 |
| fb (in air) | 13.73 | |
| Full Length (in air) | 65.14 | |
| IH | 11.15 | |

Focal Length of Each Lens Group

| | |
|---|---|
| 1st Lens Group | 44.59 |
| 2nd Lens Group | −40.31 |
| 3rd Lens Group | 39.95 |
| Distance between Object Images upon Close-Range Focusing | 74 cm |

NUMERAL EXAMPLE 8

Unit mm

Surface Data

| Surface No. | r | d | nd | νd |
|---|---|---|---|---|
| 1 | 39.785 | 3.75 | 1.81600 | 46.62 |
| 2 | −986.669 | 0.10 | | |
| 3 | 27.350 | 4.56 | 1.59282 | 68.63 |
| 4 | −110.314 | 1.00 | 2.00069 | 25.46 |
| 5 | 126.007 | 1.71 | | |
| 6 (Stop) | ∞ | d6 | | |
| 7 | 49.880 | 1.00 | 1.59270 | 35.31 |
| 8 | 25.474 | 2.24 | | |
| 9 | −59.709 | 0.99 | 1.51742 | 52.43 |
| 10 | 19.810 | d10 | | |
| 11 | 96.391 | 2.81 | 1.77250 | 49.60 |
| 12 | −61.003 | 0.10 | | |
| 13 | 43.033 | 4.00 | 1.59282 | 68.63 |
| 14 | −40.931 | 6.64 | | |
| 15 | −32.349 | 1.00 | 1.74950 | 35.28 |
| 16 | 143.481 | 8.99 | | |
| 17 | ∞ | 0.65 | 1.51633 | 64.14 |
| 18 | ∞ | 0.85 | | |
| 19 | ∞ | 0.82 | 1.54424 | 70.86 |
| 20 | ∞ | 0.76 | 1.51300 | 61.08 |
| 21 | ∞ | 1.08 | 1.54424 | 70.86 |
| 22 | ∞ | 0.45 | | |
| 23 | ∞ | 0.80 | 1.50700 | 63.38 |
| 24 | ∞ | 0.75 | | |
| Image Plane | ∞ | | | |

| | Infinity | Close-Range |
|---|---|---|
| d6 | 1.38 | 2.65 |
| d10 | 13.91 | 12.64 |

-continued

Unit mm

Various Data

|  |  |  |
|---|---|---|
| f | 46.71 | 45.92 |
| Fno | 1.84 | 1.81 |
| 2ω (Angle of View (°)) | 26.73 | 25.41 |
| fb (in air) | 13.72 | |
| Full Length (in air) | 58.90 | |
| IH | 11.15 | |

Focal Length of Each Lens Group

| | |
|---|---|
| 1st Lens Group | 30.82 |
| 2nd Lens Group | −21.30 |
| 3rd Lens Group | 32.72 |
| Distance between Object Images upon Close-Range Focusing | 85 cm |

NUMERAL EXAMPLE 9

Unit mm

Surface Data

| Surface No. | r | d | nd | vd |
|---|---|---|---|---|
| 1 | 50.728 | 3.63 | 1.81600 | 46.62 |
| 2 | −296.362 | 0.10 | | |
| 3 | 28.253 | 5.23 | 1.59282 | 68.62 |
| 4 | −77.351 | 1.00 | 1.84666 | 23.78 |
| 5 | −6928.538 | 1.00 | 1.59270 | 35.31 |
| 6 | 34.493 | 3.44 | | |
| 7 (Stop) | ∞ | d7 | | |
| 8 | −98.588 | 0.99 | 1.49700 | 81.54 |
| 9 | 22.343 | d9 | | |
| 10 | 102.097 | 2.78 | 1.75500 | 52.32 |
| 11 | −54.433 | 0.10 | | |
| 12 | 30.424 | 3.96 | 1.59282 | 68.63 |
| 13 | −69.822 | 5.79 | | |
| 14 | −43.217 | 1.00 | 1.68893 | 31.07 |
| 15 | 36.958 | 8.98 | | |
| 16 | ∞ | 0.65 | 1.51633 | 64.14 |
| 17 | ∞ | 0.85 | | |
| 18 | ∞ | 0.82 | 1.54424 | 70.86 |
| 19 | ∞ | 0.76 | 1.51300 | 61.08 |
| 20 | ∞ | 1.08 | 1.54424 | 70.86 |
| 21 | ∞ | 0.45 | | |
| 22 | ∞ | 0.80 | 1.50700 | 63.38 |
| 23 | ∞ | 0.75 | | |
| Image Plane | ∞ | | | |

| | Infinity | Close-Range |
|---|---|---|
| D7 | 1.96 | 9.05 |
| d9 | 18.82 | 11.73 |

Various Data

|  |  |  |
|---|---|---|
| f | 46.95 | 45.75 |
| Fno | 1.84 | 1.80 |
| 2ω (Angle of View (°)) | 26.83 | 22.63 |
| fb (in air) | 13.72 | |
| Full Length (in air) | 63.51 | |
| IH | 11.15 | |

Focal Length of Each Lens Group

| | |
|---|---|
| 1st Lens Group | 44.18 |
| 2nd Lens Group | −36.55 |
| 3rd Lens Group | 36.76 |
| Distance between Object Images upon Close-Range Focusing | 40 cm |

NUMERAL EXAMPLE 10

Unit mm

Surface Data

| Surface No. | r | d | nd | vd |
|---|---|---|---|---|
| 1 | 38.210 | 4.85 | 1.81600 | 46.62 |
| 2 | −696.429 | 0.10 | | |
| 3 | 38.546 | 6.04 | 1.59282 | 68.62 |
| 4 | −69.680 | 1.00 | 2.00069 | 25.46 |
| 5 | 79.121 | 2.20 | | |
| 6 (Stop) | ∞ | d6 | | |
| 7 | −84.999 | 0.79 | 1.49700 | 81.54 |
| 8 | 22.376 | d8 | | |
| 9 | 183.082 | 2.05 | 1.81600 | 46.62 |
| 10 | −53.617 | 0.10 | | |
| 11 | 30.944 | 4.65 | 1.59282 | 68.62 |
| 12 | −71.308 | 7.41 | | |
| 13 | −41.882 | 1.00 | 1.72151 | 29.23 |
| 14 | 40.015 | 8.94 | | |
| 15 | ∞ | 0.65 | 1.51633 | 64.14 |
| 16 | ∞ | 0.85 | | |
| 17 | ∞ | 0.82 | 1.54424 | 70.86 |
| 18 | ∞ | 0.76 | 1.51300 | 61.08 |
| 19 | ∞ | 1.08 | 1.54424 | 70.86 |
| 20 | ∞ | 0.45 | | |
| 21 | ∞ | 0.80 | 1.50700 | 63.38 |
| 22 | ∞ | 0.75 | | |
| Image Plane | ∞ | | | |

| | Infinity | Close-Range |
|---|---|---|
| d6 | 1.89 | 7.21 |
| d8 | 19.64 | 14.32 |

Various Data

|  |  |  |
|---|---|---|
| f | 47.46 | 46.79 |
| Fno | 1.84 | 1.82 |
| 2ω (Angle of View (°)) | 26.64 | 23.20 |
| fb (in air) | 13.68 | |
| Full Length (in air) | 65.37 | |
| IH | 11.15 | |

Focal Length of Each Lens Group

| | |
|---|---|
| 1st Lens Group | 44.81 |
| 2nd Lens Group | −35.55 |
| 3rd Lens Group | 36.65 |
| Distance between Object Images upon Close-Range Focusing | 50 cm |

FIGS. 11 to 20 are diagrams for the aberrations of Examples 1 to 10, in which (a) is illustrative of aberrations upon focusing at infinity, and (b) are illustrative of aberrations upon close-range focusing.

Spherical aberration and chromatic aberration of magnification are indicated by numerals at the respective wavelengths of 435.8 nm (g-line: a one-dot chain line), 587.6 nm (d-line: a solid line), and 656.3 nm (C-line: a broken line). Astigmatism is given with the sagittal image surface as a solid line and the meridional image surface as a dotted line. Note here that FNO and IH are indicative of an F-number and an image height, respectively.

The values of Conditions (1) to (9) in the respective examples are set out below.

| Condition | Example 1 | Example 2 | Example 3 | Example 4 | Example 5 |
|---|---|---|---|---|---|
| (1) | −1.45 | −0.17 | −1.37 | −0.58 | −0.88 |
| (2) | −2.42 | 0.83 | −2.13 | −0.85 | −2.04 |

-continued

| Condition | Example 1 | Example 2 | Example 3 | Example 4 | Example 5 |
|---|---|---|---|---|---|
| (3) | 0.14 | 0.02 | 0.21 | 0.08 | 0.20 |
| (4) | 0.39 | 0.27 | 0.41 | 0.57 | 0.49 |
| (5) | — | −1.15 | — | — | — |
| (6) | 0.73 | 0.81 | 0.75 | 0.78 | 0.78 |
| (7) | 0.61 | 0.63 | 0.70 | 0.83 | 0.71 |
| (8) | 0.07 | 0.09 | 0.07 | 0.06 | 0.06 |
| (9) | 0.07 | 0.07 | 0.09 | 0.14 | 0.07 |

| Condition | Example 6 | Example 7 | Example 8 | Example 9 | Example 10 |
|---|---|---|---|---|---|
| (1) | −0.65 | −0.64 | −1.07 | −0.78 | −0.77 |
| (2) | −1.07 | −1.16 | −2.19 | −1.28 | −1.33 |
| (3) | 0.11 | 0.10 | 0.20 | 0.16 | 0.20 |
| (4) | 0.50 | 0.56 | 0.45 | 0.52 | 0.54 |
| (5) | — | — | — | 0.63 | 0.58 |
| (6) | 0.78 | 0.79 | 0.77 | 0.78 | 0.79 |
| (7) | 0.80 | 0.76 | 0.71 | 0.66 | 0.67 |
| (8) | 0.08 | 0.09 | 0.07 | 0.11 | 0.09 |
| (9) | 0.14 | 0.07 | 0.07 | 0.07 | 0.06 |

Figure 21:
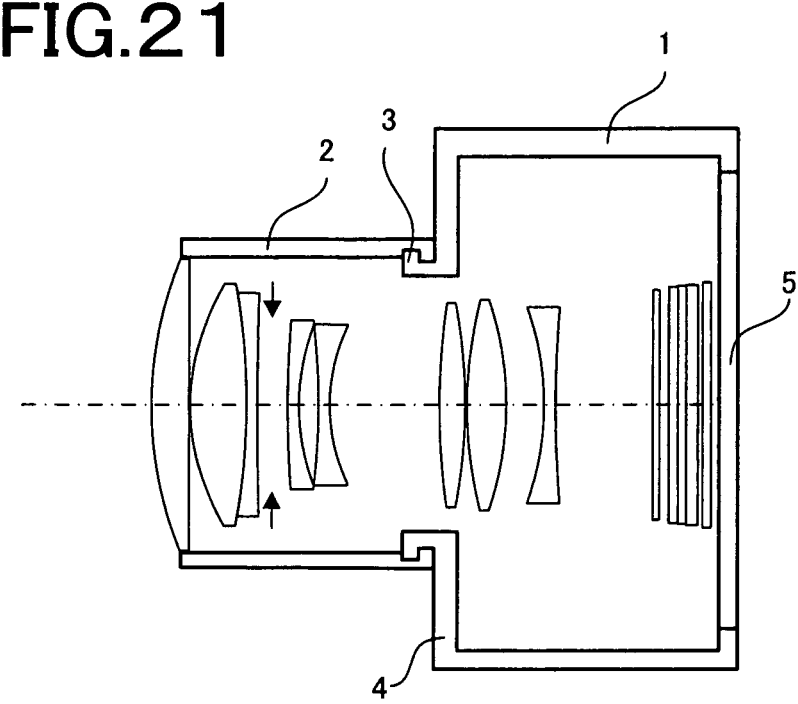
FIG. 21 is illustrative in section of a lens interchangeable type camera wherein a wide-angle lens is used for an interchangeable lens.

FIG. 21 is a sectional view of a single-lens mirrorless camera in the form of an electronic imaging apparatus using typically a small-format CCD or CMOS as an imaging device. In FIG. 21, reference numeral 1 is a single-lens mirrorless camera, and 2 is a taking lens system received in a lens barrel. Reference numeral 3 is a lens barrel mount that makes the taking lens system 2 attachable to and detachable from the single-lens mirrorless camera 1. To this end a screw type mount or a bayonet type mount is used. Reference numerals 4 and 5 are an imaging device plane and a back monitor, respectively.

The inventive lenses set forth typically in Examples 1 to 10 are used for the taking lens system 2 in the single-lens mirrorless camera 1 of such construction.

According to the embodiment here, a compact optical system, which is built up of fewer lenses and well corrected for aberrations such as distortion, chromatic aberrations and field curvature, and has telecentric capabilities, is provided as an interchangeable lens well fit for a single-lens mirrorless type digital camera.

Figure 22:
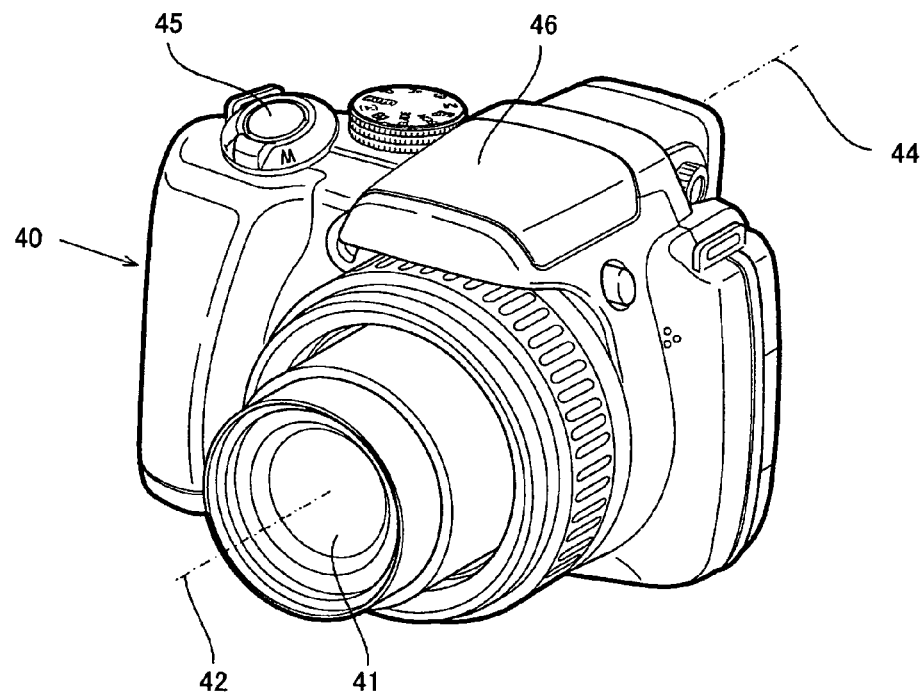
FIG. 22 is a front perspective view of the outside shape of a digital camera.
Figure 23:
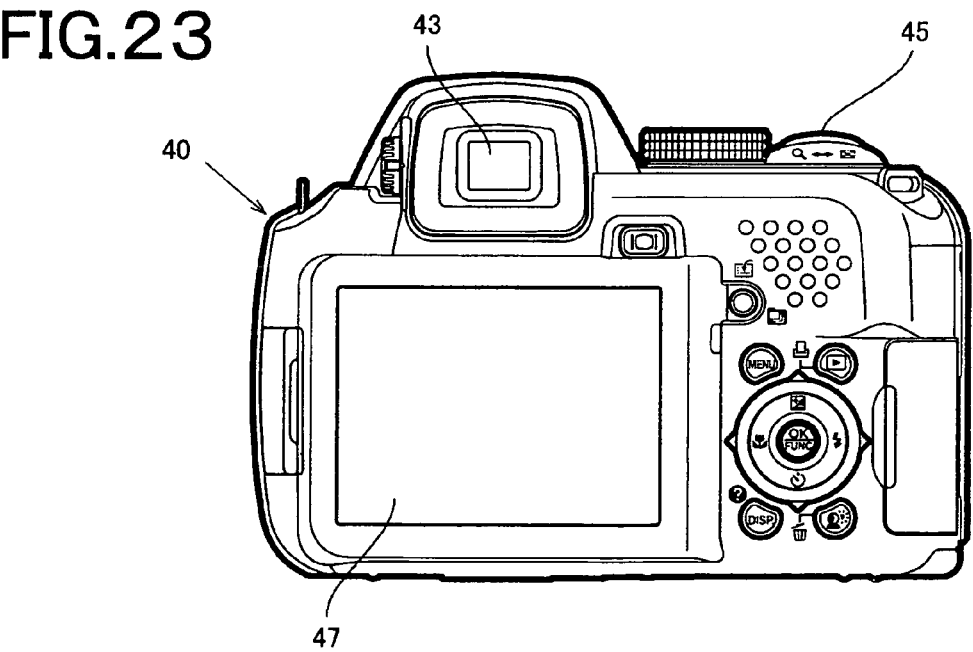
FIG. 23 is a rear view of the digital camera of FIG. 22.
Figure 24:
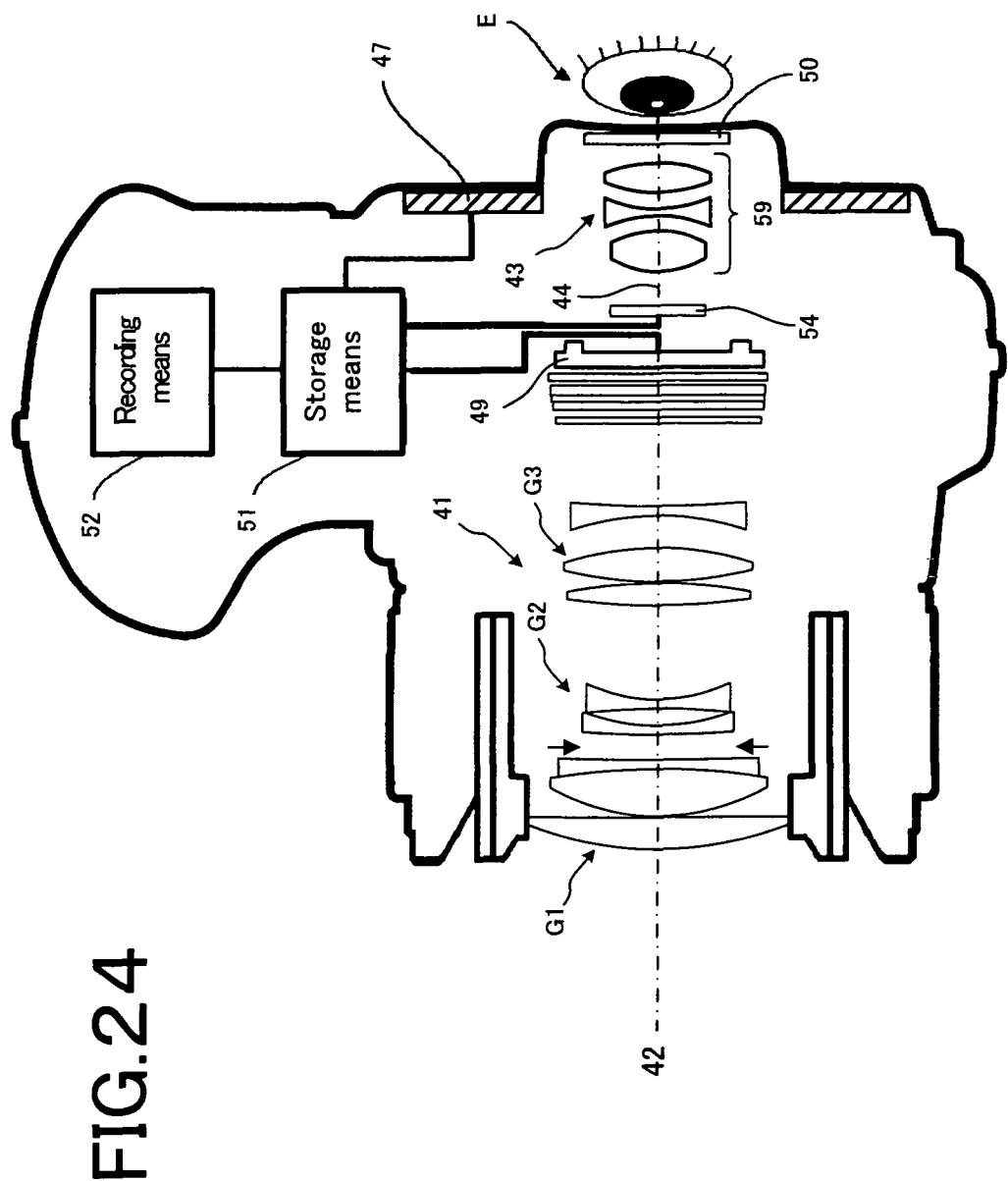
FIG. 24 is a cross sectional view of the digital camera of FIG. 22.

FIGS. 22, 23 and 24 are illustrative in conception of another embodiment of the inventive imaging apparatus in which the lens is built in a taking optical system 41. More specifically, FIG. 22 is a front perspective view of the outside shape of a digital camera 40, FIG. 23 is a rear view of the same, and FIG. 24 is a schematic cross-sectional view of the digital camera 40.

In this embodiment, the digital camera 40 includes a taking optical system 41 positioned on a taking optical path 42, a finder optical system 43 positioned on a finder optical path 44, a shutter button 45, a popup strobe 46, a liquid crystal display monitor 47, and so on. As the shutter button 45 located on the upper portion of the camera 40 is pressed down, it causes images to be taken through the taking optical system 41, for instance, the lens of Example 1. An object image formed through the taking optical system 41 is formed on the imaging plane (photoelectric transformation plane) of the imaging device CCD 49 located in the vicinity of the imaging plane. The object image received on CCD 49 is displayed as an electronic image on the liquid crystal display monitor 47 located on the back of the camera or a finder image display device 54 via a processing means 51. The processing means 51 may be connected with a recording means 52 to record the taken images.

It is here noted that the recording means 52 may be provided separately from the processing means 51 or, alternatively, it may be designed to electronically implement recording or writing by a flexible disk, a memory card, an MO or the like. If a silver halide film is provided in place of CCD 49, then a silver halide camera may be set up.

In addition, a finder eyepiece lens 59 is disposed on the finder optical path 44. An object image displayed on the finder image display device 54 is magnified and regulated to an easy-to-see diopter by the finder eyepiece lens 54, and then guided into a viewer s eyeball E. It is here noted that a cover glass 50 is disposed on the exit side of the finder eyepiece lens 59.

Figure 25:
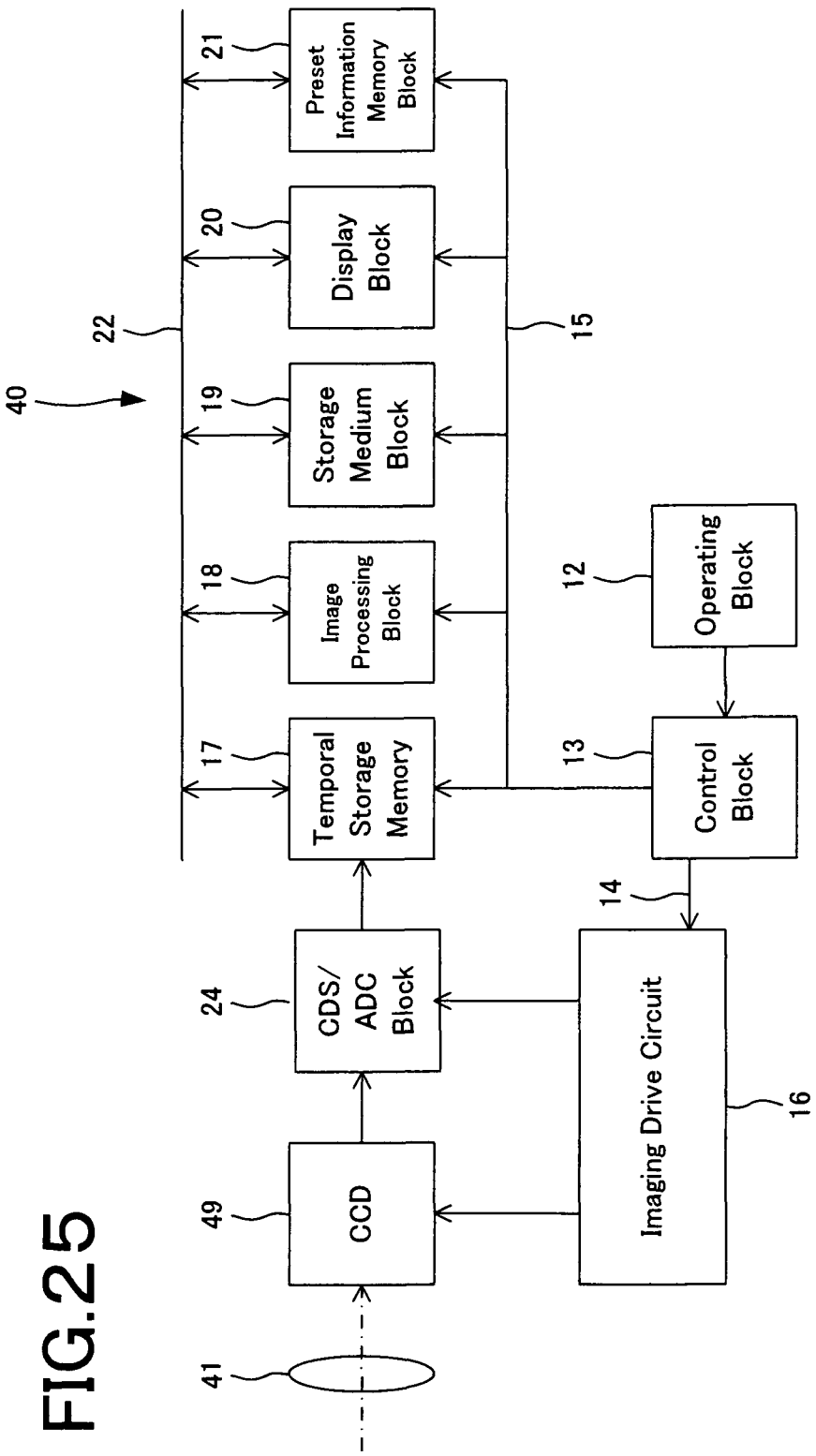
FIG. 25 is a block diagram of the internal circuitry in the main part of the digital camera of FIG. 22.

FIG. 25 is a block diagram for the internal circuitry in the main part of the digital camera 40. In what follows, the processing means 51 is made up of, typically, a CDS/ADC block 24, a temporary storage memory 17, and an image processing block 18, and a storage means 52 is made up of, typically, a storage medium block 19.

As shown in FIG. 25, the digital camera 40 includes an operating block 12, a control block 13 connected to the operating block 12, an imaging drive circuit 16 and a temporal storage memory 17 connected to the control signal output port of the control block 13 via buses 14 and 15, an image processing block 18, a storage medium block 19, a display block 20, and a preset information storage memory block 21.

The temporal storage memory 17, image processing block 18, storage medium block 19, display block 20 and preset storage memory block 21 are designed such that data are mutually entered in or produced out of them via a bus 22, and the imaging drive circuit 16 is connected with the CCD 49 and CDS/ADC block 24.

The operating block 12 is a circuit including various input buttons and switches, through which event information entered (by a camera operator) from outside is notified to the control block. The control block 13 is a central computing unit that is made up of typically a CPU and has a built-in program memory (not shown): it is a circuit that, according to the program loaded in that program memory, receives commands entered by the camera operator via the operating block 12 to have control over the digital camera 40.

The CCD 49 receives an object image formed through the inventive taking optical system 41. More specifically, the CCD 49 is an imaging device that is driven and controlled by the taking drive circuit 16, and converts light quantity per pixel of that object image into electrical signals that are in turn sent out to the CDS/ADC block 24.

The CDS/ADC block 24 is a circuit that amplifies electrical signals entered from CCD 49 and subjects them to analog-to-digital conversion so that image raw data (Bayer data: hereinafter called the RAW data) subjected only to amplification and digital conversion are sent out to the temporal memory 17.

The temporal storage memory 17 is a buffer made up of typically an SDRAM: it is a memory device for temporal storage of the RAW data produced out of the CDS/ADC block 24. The image processing block 18 is a circuit that reads out the RAW data stored in the temporal storage memory 17 or the RAW data stored in the storage medium block 19 thereby electrically implementing various forms of processing based on an image quality parameter instructed by the control block 13.

The storage medium block 19 is a control circuit for a device that detachably receives a card type or stick type recording medium comprising typically a flash memory so that the RAW data transferred from the temporal memory 17 or image data processed at the image processing block 18 are recorded and held in that card type or stick type flash memory.

The display block 20 is a circuit that includes the liquid crystal display monitor 47 and finder image display device 54 to display images, operating menus or the like on them. The preset information storage memory block 21 includes a ROM sub-block having various image quality parameters previously loaded in it, and a RAM sub-block for storing an image quality parameter selected from among image quality parameters read out of that ROM sub-block by entering operation of the operating block 12. The preset information storage memory block 21 is a circuit for controlling inputs to or outputs out of those memories.

The embodiment here provides an imaging optical system that works in favor of dustproofing and soundproofing, and makes it easy to have optical performance albeit being of small-format size. Furthermore, it is possible to provide an imaging apparatus incorporating such an imaging optical system.

What is claimed is:

1. An imaging optical system consisting of, in order from an object side thereof,
    a first lens group of positive refracting power,
    a second lens group of positive or negative refracting power, and
    a third lens group of positive refracting power, wherein:
    an aperture stop is located between an object-side surface in the first lens group and an object-side surface in the second lens group;
    a lens on the most object side of the first lens group, and a lens on the most image side of the third lens group remains constantly fixed;
    upon focusing from a far distance to a near distance, only the second lens group moves on an optical axis;
    the third lens group comprises a front sub-lens component of positive refracting power and a rear sub-lens component of negative refracting power; and
    an axial air separation between the front sub-lens component of positive refracting power and the rear sub-lens component of negative refracting power is larger than an axial air separation between other lenses in the third lens group;
    wherein the first lens group and the third lens group remain constantly fixed.

2. An imaging optical system consisting of, in order from an object side thereof,
    a first lens group of positive refracting power,
    a second lens group of positive or negative refracting power, and
    a third lens group of positive refracting power, wherein:
    an aperture stop is located between an object-side surface in the first lens group and an object-side surface in the second lens group;
    a lens on the most object side of the first lens group, and a lens on the most image side of the third lens group remains constantly fixed;
    upon focusing from a far distance to a near distance, only the second lens group moves on an optical axis;
    the third lens group comprises a front sub-lens component of positive refracting power and a rear sub-lens component of negative refracting power; and
    an axial air separation between the front sub-lens component of positive refracting power and the rear sub-lens component of negative refracting power is larger than an axial air separation between other lenses in the third lens group;
    wherein the following Condition (2) is satisfied:

$$0.1 < |f/f_{2G}| < 5.0 \qquad (2)$$

where f is a focal length of the imaging optical system, and $f_{2G}$ is a focal length of the second lens group.

3. An imaging optical system consisting of, in order from an object side thereof,
    a first lens group of positive refracting power,
    a second lens group of positive or negative refracting power, and
    a third lens group of positive refracting power, wherein:
    an aperture stop is located between an object-side surface in the first lens group and an object-side surface in the second lens group;
    a lens on the most object side of the first lens group, and a lens on the most image side of the third lens group remains constantly fixed;
    upon focusing from a far distance to a near distance, only the second lens group moves on an optical axis;
    the third lens group comprises a front sub-lens component of positive refracting power and a rear sub-lens component of negative refracting power; and
    an axial air separation between the front sub-lens component of positive refracting power and the rear sub-lens component of negative refracting power is larger than an axial air separation between other lenses in the third lens group;
    wherein upon focusing at the farthest distance, an axial air separation between an image side of the second lens group and an object side of the third lens group is larger than other axial air separation in the optical system.

4. An imaging optical system consisting of, in order from an object side thereof,
    a first lens group of positive refracting power,
    a second lens group of positive or negative refracting power, and
    a third lens group of positive refracting power, wherein:
    an aperture stop is located between an object-side surface in the first lens group and an object-side surface in the second lens group;
    a lens on the most object side of the first lens group, and a lens on the most image side of the third lens group remains constantly fixed;
    upon focusing from a far distance to a near distance, only the second lens group moves on an optical axis;
    the third lens group comprises a front sub-lens component of positive refracting power and a rear sub-lens component of negative refracting power; and
    an axial air separation between the front sub-lens component of positive refracting power and the rear sub-lens component of negative refracting power is larger than an axial air separation between other lenses in the third lens group;
    wherein the second lens group comprises two lenses at most.

5. The imaging optical system according to claim 4, wherein the second lens group consists of a lens unit of negative refracting power, and moves toward an image side of the optical system upon focusing from a far distance to a near distance.

6. The imaging optical system according to claim 5, wherein the second lens group consists of one lens of negative refracting power.

7. The imaging optical system according to claim 5, which satisfies the following Condition (5):

$$-0.99 < (R_1+R_2)/(R_1-R_2) < 0.99 \qquad (5)$$

where R1 is a paraxial radius of curvature of an object-side lens surface in the lens unit of negative refracting power in the second lens group, and $R_2$ is a paraxial radius of curvature of an image-side surface in the lens unit of negative refracting power in the second lens group.

8. The imaging optical system according to claim 4, wherein the second lens group consists of a lens unit of positive refracting power, and moves toward the object side of the optical system upon focusing from a far distance to a near distance.

9. The imaging optical system according to claim 8, wherein the second lens group consists of one lens of positive refracting power.

10. The imaging optical system according to claim 4, wherein the second lens group consists of a lens of negative refracting power and a lens of positive refracting power.

11. The imaging optical system according to claim 10, wherein the lens of negative refracting power and the lens of positive refracting power in the second lens group are cemented together.

12. The imaging optical system according to claim 4, wherein the second lens group consists of a lens of negative refracting power and a lens of negative refracting power.

13. The imaging optical system according to claim 4, wherein the second lens group consists of one lens convex on its object side and a double-concave lens.

14. An imaging optical system consisting of, in order from an object side thereof,
   a first lens group of positive refracting power,
   a second lens group of positive or negative refracting power, and
   a third lens group of positive refracting power, wherein:
   an aperture stop is located between an object-side surface in the first lens group and an object-side surface in the second lens group;
   a lens on the most object side of the first lens group, and a lens on the most image side of the third lens group remains constantly fixed;
   upon focusing from a far distance to a near distance, only the second lens group moves on an optical axis;
   the third lens group comprises a front sub-lens component of positive refracting power and a rear sub-lens component of negative refracting power; and
   an axial air separation between the front sub-lens component of positive refracting power and the rear sub-lens component of negative refracting power is larger than an axial air separation between other lenses in the third lens group;
   wherein the aperture stop is located on an image side of the first lens group;
   wherein the first lens group comprises two lenses of positive refracting power and a lens of negative refracting power; and
   wherein the first lens group consists of, in order from the object side, a lens component of positive refracting power, and a cemented lens of a lens convex on its object side and having positive refracting power and a lens of negative refracting power.

15. An imaging optical system consisting of, in order from an object side thereof,
   a first lens group of positive refracting power,
   a second lens group of positive or negative refracting power, and
   a third lens group of positive refracting power, wherein:
   an aperture stop is located between an object-side surface in the first lens group and an object-side surface in the second lens group;
   a lens on the most object side of the first lens group, and a lens on the most image side of the third lens group remains constantly fixed;
   upon focusing from a far distance to a near distance, only the second lens group moves on an optical axis;
   the third lens group comprises a front sub-lens component of positive refracting power and a rear sub-lens component of negative refracting power; and
   an axial air separation between the front sub-lens component of positive refracting power and the rear sub-lens component of negative refracting power is larger than an axial air separation between other lenses in the third lens group;
   wherein the front sub-lens component of positive refracting power comprises two lenses, and the rear sub-lens component of negative refracting power comprises a lens component of negative refracting power.

16. The imaging optical system according to claim 15, wherein the front sub-lens component of positive refracting power consists of two positive lenses.

17. An imaging optical system consisting of, in order from an object side thereof,
   a first lens group of positive refracting power,
   a second lens group of positive or negative refracting power, and
   a third lens group of positive refracting power, wherein:
   an aperture stop is located between an object-side surface in the first lens group and an object-side surface in the second lens group;
   a lens on the most object side of the first lens group, and a lens on the most image side of the third lens group remains constantly fixed;
   upon focusing from a far distance to a near distance, only the second lens group moves on an optical axis;
   the third lens group comprises a front sub-lens component of positive refracting power and a rear sub-lens component of negative refracting power; and
   an axial air separation between the front sub-lens component of positive refracting power and the rear sub-lens component of negative refracting power is larger than an axial air separation between other lenses in the third lens group;
   wherein the following Condition (7) is satisfied:

$$0.5 < ES/E_{1Gf} < 0.95 \quad (7)$$

where ES is an effective diameter of the aperture stop, and $E_{1Gf}$ is an effective diameter of an object-side surface in the first lens group provided that when there is an effective diameter change, it refers to an effective diameter upon full-aperture.

18. An imaging optical system consisting of, in order from an object side thereof,
   a first lens group of positive refracting power,
   a second lens group of positive or negative refracting power, and
   a third lens group of positive refracting power, wherein:
   an aperture stop is located between an object-side surface in the first lens group and an object-side surface in the second lens group;
   a lens on the most object side of the first lens group, and a lens on the most image side of the third lens group remains constantly fixed;
   upon focusing from a far distance to a near distance, only the second lens group moves on an optical axis;
   the third lens group comprises a front sub-lens component of positive refracting power and a rear sub-lens component of negative refracting power; and an axial air separation between the front sub-lens component of positive refracting power and the rear sub-lens component of negative refracting power is larger than an axial air separation between other lenses in the third lens group;

wherein the following Conditions (8) and (9) are satisfied:

$$0.03 < DS_{on\_ax}/f < 0.19 \tag{8}$$

$$0.03 < DS_{off\_ax}/f < 0.19 \tag{9}$$

where $DS_{on\_ax}$ is an axial distance between an object-side lens surface and an image-side lens surface with an aperture stop-receiving space interposed between them, $DS_{off\_ax}$ is a distance as measured at positions where light rays at the object-side lens surface and the image-side surface with the aperture stop-receiving space interposed between them grow the highest and in a direction parallel to an optical axis, provided that when there is a distance change, it refers to the minimum value, and f is a focal length of the imaging optical system.

* * * * *